US009160976B2

(12) United States Patent
McCarthy et al.

(10) Patent No.: US 9,160,976 B2
(45) Date of Patent: Oct. 13, 2015

(54) METHOD AND APPARATUS FOR DISTRIBUTING MEDIA IN A PAY PER PLAY ARCHITECTURE WITH REMOTE PLAYBACK WITHIN AN ENTERPRISE

(75) Inventors: Tom McCarthy, Nashua, NH (US); Jateen Parekh, San Francisco, CA (US); Mark Goodwin, Mountain View, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1525 days.

(21) Appl. No.: 11/021,096

(22) Filed: Dec. 22, 2004

(65) Prior Publication Data
US 2005/0283791 A1    Dec. 22, 2005

Related U.S. Application Data

(60) Provisional application No. 60/531,965, filed on Dec. 23, 2003.

(51) Int. Cl.
*H04N 7/18* (2006.01)
*H04N 7/173* (2011.01)
(Continued)

(52) U.S. Cl.
CPC ......... *H04N 7/17318* (2013.01); *H04N 7/1675* (2013.01); *H04N 7/17336* (2013.01); *H04N 21/2143* (2013.01); *H04N 21/23473* (2013.01); *H04N 21/2543* (2013.01); *H04N 21/4147* (2013.01); *H04N 21/43615* (2013.01);
(Continued)

(58) Field of Classification Search
CPC .................................................. H04N 21/2143
USPC .................................... 725/82, 104, 142, 132
See application file for complete search history.

(56) References Cited

U.S. PATENT DOCUMENTS 4,506,387 A    3/1985    Walter
4,528,589 A    7/1985    Block et al.
(Continued)

FOREIGN PATENT DOCUMENTS

EP    1100266    5/2001
JP    10-322676    12/1998
(Continued)

OTHER PUBLICATIONS

International Search Report, PCT/US04/43572, Nov. 29, 2006.

*Primary Examiner* — Fernando Alcon
(74) *Attorney, Agent, or Firm* — McDonnell Boehnen Hulbert & Berghoff LLP

(57) ABSTRACT

Systems and methods for rendering media content are provided. Systems of the invention can comprise a first platform for accessing, storing and distributing media content, wherein the media content comprises an unrenderable state when received by the first platform; a second platform communicatively coupled with the first platform for rendering the stored media content; the first and second platforms cooperatively providing an interface for purchasing a right to render stored or accessible media content at least one time; and at least one of the first platform and the second platform being operable to convert the stored or accessible media content to a renderable state upon the purchase of the right to render, wherein the first and second platforms are communicatively coupled to the Internet. Systems are preferably operably connected to the Internet and can provide access to content sources local to and remote from the system of the invention.

26 Claims, 10 Drawing Sheets

(51) Int. Cl.
   *H04N 7/167* (2011.01)
   *H04N 21/214* (2011.01)
   *H04N 21/2347* (2011.01)
   *H04N 21/2543* (2011.01)
   *H04N 21/4147* (2011.01)
   *H04N 21/436* (2011.01)
   *H04N 21/4405* (2011.01)
   *H04N 21/4627* (2011.01)
   *H04N 21/472* (2011.01)
   *H04N 21/4788* (2011.01)
   *H04N 21/61* (2011.01)
   *H04N 21/8355* (2011.01)

(52) U.S. Cl.
   CPC ..... *H04N21/4405* (2013.01); *H04N 21/44055* (2013.01); *H04N 21/4627* (2013.01); *H04N 21/4788* (2013.01); *H04N 21/47202* (2013.01); *H04N 21/6125* (2013.01); *H04N 21/6175* (2013.01); *H04N 21/8355* (2013.01)

(56) References Cited

U.S. PATENT DOCUMENTS

| | | | |
|---|---|---|---|
| 4,682,248 A | 7/1987 | Schwartz | |
| 4,864,614 A | 9/1989 | Crowther | |
| 4,885,775 A | 12/1989 | Lucas | |
| 4,972,396 A | 11/1990 | Rafner | |
| 4,995,078 A | 2/1991 | Monslow et al. | |
| 5,003,384 A | 3/1991 | Durden et al. | |
| 5,133,079 A | 7/1992 | Ballantyne et al. | |
| 5,351,075 A | 9/1994 | Herz et al. | |
| 5,440,336 A | 8/1995 | Buhro et al. | |
| 5,477,263 A | 12/1995 | O'Callaghan et al. | |
| 5,572,442 A | 11/1996 | Schulhof et al. | |
| 5,619,247 A | 4/1997 | Russo | |
| 5,724,521 A * | 3/1998 | Dedrick | 705/26.1 |
| 5,729,279 A | 3/1998 | Fuller | |
| 5,729,549 A | 3/1998 | Kostreski et al. | |
| 5,790,935 A * | 8/1998 | Payton | 725/91 |
| 5,818,512 A | 10/1998 | Fuller | |
| 5,884,284 A | 3/1999 | Peters et al. | |
| 5,899,582 A | 5/1999 | DuLac | |
| 5,945,988 A * | 8/1999 | Williams et al. | 715/747 |
| 5,977,964 A * | 11/1999 | Williams et al. | 725/139 |
| 5,990,885 A * | 11/1999 | Gopinath | 715/716 |
| 6,002,393 A | 12/1999 | Hite et al. | |
| 6,020,880 A | 2/2000 | Naimpally | |
| 6,025,868 A * | 2/2000 | Russo | 725/104 |
| 6,029,046 A | 2/2000 | Khan et al. | |
| 6,289,314 B1 | 9/2001 | Matsuzaki et al. | |
| 6,324,338 B1 | 11/2001 | Wood et al. | |
| 6,470,138 B1 | 10/2002 | Um et al. | |
| 6,480,961 B2 | 11/2002 | Rajasekharan et al. | |
| 6,490,408 B1 | 12/2002 | Um et al. | |
| 6,546,193 B1 | 4/2003 | Um et al. | |
| 6,598,230 B1 | 7/2003 | Ballhorn | |
| 6,642,939 B1 | 11/2003 | Vallone et al. | |
| 6,647,411 B2 * | 11/2003 | Towell et al. | 709/213 |
| 6,698,020 B1 | 2/2004 | Zigmond et al. | |
| 6,701,060 B2 | 3/2004 | Yuen et al. | |
| 7,328,166 B1 * | 2/2008 | Geoghegan et al. | 705/5 |
| 2001/0039659 A1 * | 11/2001 | Simmons et al. | 725/87 |
| 2001/0044838 A1 | 11/2001 | Iida | |
| 2001/0056578 A1 | 12/2001 | Hwang et al. | |
| 2002/0049977 A1 * | 4/2002 | Miller et al. | 725/82 |
| 2002/0083445 A1 * | 6/2002 | Flickinger et al. | 725/35 |
| 2002/0107806 A1 | 8/2002 | Higashi et al. | |
| 2002/0144262 A1 * | 10/2002 | Plotnick et al. | 725/42 |
| 2002/0144275 A1 * | 10/2002 | Kay et al. | 725/87 |
| 2002/0162109 A1 * | 10/2002 | Shteyn | 725/87 |
| 2002/0162112 A1 * | 10/2002 | Javed | 725/134 |
| 2002/0196941 A1 | 12/2002 | Isaacson et al. | |
| 2003/0046269 A1 | 3/2003 | Yamazaki | |
| 2003/0046699 A1 | 3/2003 | Nonomura et al. | |
| 2003/0131355 A1 * | 7/2003 | Berenson et al. | 725/46 |
| 2003/0135860 A1 * | 7/2003 | Dureau | 725/82 |
| 2003/0192055 A1 | 10/2003 | Aoki et al. | |
| 2004/0015999 A1 * | 1/2004 | Carlucci et al. | 725/136 |
| 2005/0074121 A1 | 4/2005 | Miura | |
| 2011/0036137 A1 | 2/2011 | Pong | |

FOREIGN PATENT DOCUMENTS

| | | |
|---|---|---|
| JP | 2000-113066 | 4/2000 |
| JP | 2001-195407 | 7/2001 |
| JP | 2002-027417 | 1/2002 |
| JP | 2002-176419 | 6/2002 |
| JP | 2002-215624 | 8/2002 |
| JP | 2002-269090 | 9/2002 |
| JP | 2003-018515 | 1/2003 |
| JP | 2003-046921 | 2/2003 |
| JP | 2003-046958 | 2/2003 |
| JP | 2003-067415 | 3/2003 |
| JP | 2003-235010 | 8/2003 |
| WO | WO99/52279 | 10/1999 |
| WO | WO00/07368 | 2/2000 |
| WO | 00/16548 | 3/2000 |
| WO | WO00/18108 | 3/2000 |
| WO | WO00/28736 | 5/2000 |
| WO | WO00/58833 | 10/2000 |
| WO | WO00/58834 | 10/2000 |
| WO | WO00/58967 | 10/2000 |
| WO | WO00/59214 | 10/2000 |
| WO | WO00/62298 | 10/2000 |
| WO | WO00/62299 | 10/2000 |
| WO | WO00/62533 | 10/2000 |
| WO | WO00/67475 | 11/2000 |
| WO | WO01/06370 | 1/2001 |
| WO | WO01/22729 | 3/2001 |
| WO | WO01/46843 | 6/2001 |
| WO | WO01/47238 | 6/2001 |
| WO | WO01/47249 | 6/2001 |
| WO | WO01/65762 | 9/2001 |
| WO | WO01/65862 | 9/2001 |
| WO | WO01/89203 | 11/2001 |
| WO | 03/026187 | 3/2003 |
| WO | 03/032620 | 4/2003 |
| WO | 03/102948 | 12/2003 |
| WO | WO2004/100550 | 11/2004 |
| WO | WO2005/010694 | 2/2005 |
| WO | WO2005/062975 | 3/2007 |

* cited by examiner

METHOD AND APPARATUS FOR DISTRIBUTING MEDIA IN A PAY PER PLAY ARCHITECTURE WITH REMOTE PLAYBACK WITHIN AN ENTERPRISE

PRIORITY

This utility application claims priority to U.S. Provisional Patent Application Ser. No. 60/531,965, filed Dec. 23, 2003.

FIELD OF INVENTION

The current invention relates to entertainment devices and, more specifically, to systems and methods for delivering media content on a pay-per-play basis.

BACKGROUND

Advances in technology have led to numerous changes in the availability of entertainment content (e.g., audio and video content) to consumers. Such advances include the proliferation of cable television, digital satellite service television, high-definition television and satellite radio, among numerous other delivery mechanisms for audio and video content, such as music, movies, and the like. Another recent advance in this area is the delivery of media content over high-bandwidth connections to the Internet. Such high-bandwidth connections comprise data-over-cable (cable modems), digital subscriber lines and satellite systems. Further, private entertainment systems may also provide access to audio and video content, such as to guests in a hotel, for example.

These technological advances now offer content owners such as movie producers, television program producers, music producers and other originators of audio/video content with a variety of options for distributing their work. Movie producers and television programming producers, for example, may now work with service providers to package their content and distribute it via cable, satellite, or the Internet. Movie producers may enjoy their first-runs in theaters, for example, and be able to count on continued revenues from royalties earned by having their movies run on cable.

Service providers, such as television broadcasters, cable providers, digital satellite providers, along with content owners that access consumers through established broadcast systems (such as, for example Home Box Office), may generate revenue by providing content on a pay-per-view or pay-per-play basis (collectively pay-per-view or PPV). When providing content on a PPV basis, a consumer pays the content owner and/or broadcast service provider (e.g., cable television company) for the right to view or play certain content on a per view/play basis. As one example, a hotel guest may purchase the right to view a first run movie in his/her hotel room through an in-room entertainment system. The guest is then billed on his/her hotel bill for the purchased viewing of the movie. Similar scenarios exist for numerous cable television and digital satellite service subscribers. These subscribers have the option to viewing rights for movies, live sporting events, among other content, on a pay-per-view basis and are billed accordingly.

Despite the wide variety of distribution outlets available to content owners, only a very limited amount of their work is actually accessible by consumers at any specific time. A vast amount of their work remains on the shelf, despite the fact that there may indeed be an audience for it. The inaccessibility of the media results in large part from the fact that content owners must share limited time-slots on limited channels in the service providers' programming schedules. Content owners have no more flexibility on PPV systems. While some flexibility in the start time of such PPV content may be possible, consumers are limited to viewing current offerings that are available on a limited channel set (in the case of cable television systems) or, in the case of hotels, to the offerings stored on the premises.

Such arrangements are disadvantageous to consumers. One problem is that the selection of media content available to consumers is limited. Consumers simply do not choose the content to be programmed. The providers do. It is similarly disadvantageous to content owners because revenue is only generated on content currently being offered for viewing/playing by the service provider.

Current pay-per view systems also fail to provide viewers with much viewing flexibility for a specific programming selection. In this respect, PPV-delivered media content is similar to broadcast content in that a consumer must generally consume the content from beginning to end when purchased without the ability to pause and resume viewing, as they desire.

Based on the foregoing, an approach for providing PPV content that better utilizes available content and provides consumers with more selection and increased viewing flexibility is desirable. It is also desirable that such a flexible content distribution system allows users to readily connect with content providers. Further needed is content distribution that coherently and conveniently conveys the availability of content on a user's device.

SUMMARY OF THE INVENTION

In a first exemplary aspect of the invention, a system for rendering media content is provided comprising a first platform for accessing, storing and distributing media content, wherein the media content comprises an unrenderable state when received by the first platform; a second platform communicatively coupled with the first platform for rendering the stored media content; the first and second platforms cooperatively providing an interface for purchasing a right to render stored or accessible media content at least one time; and at least one of the first platform and the second platform being operable to convert the stored or accessible media content to a renderable state upon the purchase of the right to render, wherein the first and second platforms are communicatively coupled to the Internet.

In certain embodiments, the system of the first aspect further comprises a distribution server operably connected to at least one of the first and second platforms and to at least one content source, the distribution server being operable to receive requests for content and to responsively retrieve content from the content sources. In other embodiments of this aspect of the invention, the system further comprises a distribution server operably connected to at least one of the first and second platforms and to at least one content source, the distribution server being operable to track the usage of the content, payment for the content and/or commerce of the content. The distribution server can be located on-site, at the enterprise or off-site, away from the enterprise, operably connected to the Internet.

The first platform of this aspect can comprise a digital video recorder device that includes a storage device for storing the media content, and said storage device can comprise a hard disk drive. Similarly, the first platform can comprise a personal computer that includes a storage device for storing the media content, and said storage device can comprise an optical storage device, in certain embodiments, a digital versatile disk (DVD) drive.

In certain embodiments of the invention, the unrenderable state can comprise a first level of encryption that protects the media content from unauthorized rendering. Media content can be contained in a broadcast signal and the unrenderable state can comprise a second level of encryption that protects the media content from unauthorized reception and storage, said broadcast signal comprising an over-the-air broadcast, a cable broadcast, an Internet broadcast or a satellite broadcast.

In other aspects of the invention, the first platform can comprise a dedicated media storage and serving device comprising a storage device for retaining the media content; a registry including one or more parameters corresponding with functional attributes of the second platform; a network interface communicatively coupled to at least one of a media content source and to the second platform; and a media content manager that provides for the purchase of the right to render the media content, management of rendering of the media content including enforcing digital rights associated with the media content, and controlling rendering of the media content in accordance with terms of the purchase. In such embodiments, the first platform can comprise a decryptor for decrypting the media content prior to, at least one of rendering the media content with the first platform, and communication of the media content to the second platform; and a transcoder for translating the media from a first format to a second format, the first platform being further operable to render content from the second format. Further, the first platform can comprise a discovery service operable to search for content and to download content based on a content profile and/or an encryptor that encrypts the media content prior to communication of the media content to the second platform and the second platform can comprise a corresponding decryptor that decrypts the encryption of the media content performed by the first platform prior to rendering the media content.

In other related embodiments of the invention, the second platform can comprise a media rendering device; a local discovery service that communicates with the first platform to determine composition of the media content; a media communication interface for communicating with the first platform; a guide renderer for displaying a list of titles corresponding with portions of the media content that the media rendering device can render; and a decoder that converts the media content from an encoded format to a format that corresponds with the media rendering device. The media content utilized by the invention can be received via one or more of the Internet, an over-the-air transmission, a cable television transmission, a digital satellite system transmission, and an optical storage media.

In the embodiments of the invention, the second platform comprises a multiple format digital versatile disk player, a personal audio player, a high-definition television, a digital audio receiver, and/or a digital video recorder. In other embodiments, the second platform can comprise an audio/video device comprising a decoder for converting the media content from an encoded format to a decoded, renderable format, and in certain embodiments further comprise a router/network hub that operatively connects the first platform and the second platform. The first platform can receive information from the Internet comprising an electronic program guide, wherein the information from the Internet is communicated to the second platform, and the second platform can receive information from the Internet comprising an electronic program guide, wherein the information from the Internet is communicated to the second platform. In such embodiments, the information from the Internet is received over one of a digital subscriber line, a data-over-cable system, a dial-up connection and a satellite connection, and the operative connection can comprise a packet-based data network, a wireless connection, and said wireless connection can comprise a wireless connection in accordance with the IEEE 802.11 standard. Similarly, the operative connection can comprise a firewire connection in accordance with the IEEE 1394 standard.

In certain embodiments of the invention, the system further comprises a rendering controller that provides for modifying the manner in which the media content is rendered, wherein the rendering controller is implemented with at least one of the first platform and the second platform, said rendering controller can provide for stopping rendering of the media content; pausing rendering of the media content; returning to a previously rendered point of the media content and resumption of rendering from the previously rendered point; resuming rendering of the media content after stopping or pausing; and skipping portions of the media content and resuming rendering of the media content from a point that occurs later in the media content. Resuming rendering of the media content can comprise resuming rendering using the second platform when rendering of the media content was paused or stopped on the first platform.

In all embodiments in all aspects of the invention, the media content can be selected from the group consisting of audio content, video content and combined audio/video content, among others, and said media content can be stored on the first platform in a compressed format. The compressed format can comprise a format in accordance with one of the MPEG-1 standard, the MPEG-2 standard and the MPEG-4 standard, and layer 3 of the MPEG-1 standard.

The first platform can comprise a digital video recorder having a storage device for retaining, at least a portion, of the media content; a personal computer operatively coupled with the digital video recorder, wherein the personal computer provides for: the purchase of the right to render the media content; management of rendering of the media content including enforcing digital rights associated with the media content; and controlling rendering of the media content in correspondence with terms of the purchase.

Embodiments of the invention can further comprise a billing system, operably connected to the first or second platform or the Internet, said billing system being operable to track the usage, payment and commerce of media content. The billing system can be located on-site, at the enterprise or off-site, away from the enterprise, operably connected to the Internet. Other embodiments further comprise a user profile server that stores the user profiles of the system's users, operably connected to the first or second platform, said user profile server being operable to track the usage of media content by a specific user and update the specific user's user profile accordingly and/or track payment for PPPlay media content by a specific user and update the specific user's user profile accordingly and/or track commerce of media content by a specific user and update the specific user's user profile accordingly. The first and/or second platforms can be operable to read a user profile from the user profile server and receive media content compatible with the user profile, and said user profile server can be located on-site, at the enterprise or off-site, away from the enterprise, operably connected to the Internet. In certain embodiments, systems of the invention further comprise an advertising server, operably connected to the first or second platform, said advertising server being operable to provide advertising content to system users or custom tailored advertising content to specific system users and is operable to track the usage of advertising content. The advertising server can be located on-site, at the enterprise or off-site, away from the enterprise, operably connected to the Internet.

In a second exemplary aspect of the invention, a system for rendering media content on a pay-per-play basis is provided comprising a first platform operatively connected to the Internet for receiving media content for purchase from one or more content sources selected from the group consisting of a content provider operatively connected to the Internet, an alternate first platform operatively connected to said first platform, an alternate first platform operatively connected to the Internet, a second platform operatively connected to the first platform and a second platform operatively connected to the Internet, wherein the received media content comprises encrypted and encoded information; a storage device operatively coupled with the first platform, wherein the storage device retains the received content; a second platform operatively coupled with the first platform and storage device, wherein the second platform comprises an interface for purchasing the right to render the content received by the first platform; and at least one of the first platform and the second platform being operable to convert the stored or accessible media content to a renderable state upon the purchase of the right to render. The input device of the first platform can comprise a cable receiver, a digital satellite receiver an over-the-air television receiver and/or a router/hub coupled with the Internet. In certain embodiments, the first platform can comprise a digital video recorder and/or a personal computer.

In certain embodiments of the invention, the received content can comprise a first layer of encryption to protect the received content from unauthorized rendering and a second layer of encryption to prevent unauthorized reception and retention of the received content, and said received content can be encoded in a compressed format. The compressed format can comprise a format in accordance with one of the MPEG-1 standard, the MPEG-2 standard and the MPEG-4 standard as well as a compressed audio format in accordance with layer 3 of the MPEG-1 standard.

The storage device in certain embodiments of the aspect of the invention can comprise a hard disk drive, an optical storage device such as a digital versatile disk drive. The second platform can implement an interface for purchasing the right to render the received content in cooperation with the first platform, and said first platform can comprise a decryptor that decrypts the media content; a decoder that decodes the media content; and a transcoder that converts the media content from a first format that is not renderable by the second platform to a second format that is renderable by the second platform and communicates the media content to the second platform. Such embodiments can further comprise an encryptor for encrypting the media content prior to communicating the media content to the second platform; and wherein the second platform further comprises a decryptor for decrypting the media content as encrypted by the first platform. In related embodiments, the second platform can comprise an audio/video device including a decoder for converting the media content from an encoded format to a decoded, renderable format.

The embodiments of the second aspect of the invention can further comprise a billing system, operably connected to the first or second platform operable to track the usage of media content, payment for media content and commerce of media content. The billing system can be located on-site, at the enterprise or off-site, away from the enterprise, operably connected to the Internet.

Related embodiments can further comprise a user profile server that stores the user profiles of the system's users, operably connected to the first or second platform operable to track the usage of media content by a specific user and update the specific user's user profile accordingly, track payment for PPPlay media content by a specific user and update the specific user's user profile accordingly and track commerce of media content by a specific user and update the specific user's user profile accordingly. In such embodiments, the first and/or second platform is operable to read a user profile from the user profile server and receive media content compatible with the user profile. The user profile server can be located on-site, at the enterprise or off-site, away from the enterprise, operably connected to the Internet. Other related embodiments can further comprise an advertising server, operably connected to the first or second platform, operable to provide advertising content to system users, to provide custom tailored advertising content to specific system users and/or to track the usage of advertising content. Said advertising server can be located on-site, at the enterprise or off-site, away from the enterprise, operably connected to the Internet.

In a third aspect of the invention, a system for rendering media content is provided comprising a media server operatively connected to the Internet comprising a device for receiving unrenderable media content from one or more content sources selected from the group consisting of a content provider operatively connected to the Internet, an alternate first platform operatively connected to said first platform, an alternate first platform operatively connected to the Internet, a second platform operatively connected to the first platform and a second platform operatively connected to the Internet; a storage device for retaining the media content; a content management sub-system that provides for purchase of the right to render the media content at least one time by converting the content to a renderable format, management of the rendering of the media content including enforcing digital rights associated with the media content, and controlling rendering of the media content in correspondence with terms of the purchase; and a media client that is operatively coupled with, and discoverable by, the media server, wherein the client device comprises: a rendering device; a decoder for translating the media content from a first format to a second format, wherein the media content is communicated to the rendering device in the second format for playback; a discovery sub-system that determines a subset of content playable by the rendering device within the unrenderable content contained on the media server; and a content guide display that lists the subset of content; wherein the media server and the client device cooperatively implement an interface to allow purchase of protected content and rendering of previously purchased content in correspondence with terms of a previous purchase using at least one of the media server and the client device.

In a fourth aspect of the invention, a system for rendering media content is provided comprising a media server operatively connected to the Internet comprising a device for receiving unrenderable media content from one or more content sources selected from the group consisting of a content provider operatively connected to the Internet, one or more alternate media servers operatively connected to said media server, an alternate media server operatively connected to the Internet, a media client operatively connected to the media server and a media client operatively connected to the Internet; a storage device for retaining the media content; a content management sub-system that provides for purchase of the right to render the media content at least one time by converting the content to a renderable format, management of the rendering of the media content including enforcing digital rights associated with the media content, and controlling rendering of the media content in correspondence with terms of the purchase; and a media client that is operatively coupled with, and discoverable by, the media server, wherein the client device comprises a rendering device; a decoder for translating the media content from a first format to a second format, wherein the media content is communicated to the rendering device in the second format for playback; a discovery subsystem that determines a subset of content playable by the rendering device within the unrenderable content contained on the media server; and a content guide display that lists the subset of content; a user profile server that is operatively coupled with, and discoverable by, the media server and media client, wherein the media server and the media client are operatively connected to the user profile server and can request user profile-compatible media content from one or more content sources to be stored on the media server or media client for use or purchase by the user whose user profile was utilized for the user profile-compatible media content request.

In a fifth exemplary aspect of the invention, a media server is provided comprising a dedicated media storage and serving device for retaining a plurality of units of media content; a client platform manager including one or more parameters corresponding with functional attributes of at least one client platform; a media communication interface communicatively coupled to at least one media content source and to the client platform; a media content manager that provides for the purchase of the right to render the media content; and a discovery service operable to perform searches for content in accordance with at least one user preference on one or more content sources selected from the group consisting of a content provider operatively connected to the Internet, one or more alternate media servers operatively connected to said media server, an alternate media server operatively connected to the Internet, a media client operatively connected to the media server and a media client operatively connected to the Internet. In related embodiments, the media server further comprises an asset manager to manage the rendering of the media content including enforcing digital rights associated with the media content, and controlling rendering of the media content in accordance with terms of the purchase. In other related embodiments, the discovery service operates in accordance with a content pay service provider protocol to communicate user preferences to one or more content sources selected from the group consisting of a content provider operatively connected to the Internet, one or more alternate media servers operatively connected to said media server, an alternate media server operatively connected to the Internet, a media client operatively connected to the media server and a media client operatively connected to the Internet, wherein the discovery service requests content in accordance with the user preference.

In certain related embodiments, the media server can further comprise a content directory containing a user interface operable to display content stored in the dedicated media storage, and said content directory can further comprise a purchase mechanism operable to input a user media selection for purchase, to communicate a purchase transaction with a content pay service provider connected to the data network, and to enable rendering of the selected media. In other embodiments, the media server can further comprise a decryptor operable to decrypt the selected media upon completion of the purchase transaction and/or a decryptor operable to decrypt content received from the at least one client platform. The media server can further comprise a media rendering function operable to render media selected for rendering on a rendering device.

In a sixth exemplary embodiment, a media client is provided comprising a media rendering device interface operable to communicate or send renderable media to a media rendering device; a local discovery service that communicates with one or more content sources selected from the group consisting of a content provider operatively connected to the Internet, one or more alternate media servers operatively connected to said media server, an alternate media server operatively connected to the Internet, a media client operatively connected to the media server and a media client operatively connected to the Internet to determine availability of media content that may be purchased by a user and made renderable upon completion of a purchase transaction; a media communication interface for communicating with one the or more content sources selected from the group consisting of a content provider operatively connected to the Internet, one or more alternate media servers operatively connected to said media server, an alternate media server operatively connected to the Internet, a media client operatively connected to the media server and a media client operatively connected to the Internet; and a decoder that converts the media content from an encoded format to a format that corresponds with the media rendering device. In certain embodiments, the media client of claim can further comprise a content directory for displaying a list of titles corresponding with units of the media content that the user may purchase and thereby send to the media rendering device to render. In still other embodiments, the media client can further comprise a client manager operable to generate a user interface that displays at least one title available for purchase and a query to perform a purchase transaction, the client manager further being operable to convert the unrenderable media to a renderable format. In certain other embodiments, the media client can further comprise a decryptor operable to decrypt encrypted media content upon completion of the purchase transaction, the decryption producing a renderable format and/or a decoder/decompressor operable to convert the media in the renderable format to a media signal compatible with the rendering device.

In a seventh exemplary aspect of the invention a method for rendering media content on a pay-per-play basis is provided comprising reading a user profile from a user profile server of a guest who may utilize unrenderable PPPlay media content; querying one or more content sources selected from the group consisting of a content provider operatively connected to the Internet, a local media servers, a media server operatively connected to the Internet, a local media client and a media client operatively connected to the Internet for unrenderable PPPlay media content the is compatible with the user profile; displaying a content guide comprising a listing describing the available unrenderable PPPlay media content; receiving a request to purchase a rendering right for the unrenderable PPPlay media content, the request being generated from the content guide; removing a first level of content unrenderability; rendering the media content at least one time, wherein at least a part of the media content is rendered on a second device.

In certain embodiments the method can further comprise removing a second level of content unrenderability after receiving the media content and prior to storing the media content and/or decoding and decompressing the media content prior to rendering the media content, and/or transcoding the media content from a first format to a second format prior to rendering the content, such that the transcoded media content is renderable by a selected rendering device.

In some embodiments, removing the first level of content unrenderability comprises decrypting the media content and/or removing the first level of content unrenderability comprises unlocking a data file including the media content. In other embodiments, rendering the media content on the second device comprises providing a media content stream from the first device to the second device.

In still other embodiments of this aspect of the invention, the method further comprises, prior to rendering the media content removing the first level of content unrenderability with the first device; encrypting the media content with the first device; communicating the media content from the first device to the second device as an encrypted media stream; and decrypting the encrypted media stream with the second device.

In all embodiments of all aspects of the invention, the media content can includes meta-data describing the media content. Similarly, the systems of the invention can further comprise a user profile server that stores user profiles, and said user profiles can include meta-data describing a user's media preferences. In related embodiments, the user profile meta-data and the media content meta-data are compared to determine whether any piece of media content is compatible with the user profile. In these embodiments of the invention, media content that is determined to be compatible with the user profile can be displayed for use and purchase by the user and/or media content that is determined to be incompatible with the user profile is not displayed for use and purchase by the user. In related embodiments, the invention further comprises an advertising server that stores advertising deliverables over the systems of the invention. In certain embodiments, the analysis of user profile meta-data enables the projection of a user's advertising preferences, and advertising content that is determined to be compatible with the user profile can be displayed for viewing by the user.

In a eighth exemplary aspect of the invention a method for recording renderable media content for time-shifting on a system of the invention is provided comprising allowing a user to specify criteria for recording renderable media content on a second platform and media client; recording the selected shows updating the content registry on the first platform and second platform to reflect the recorded media content. In certain embodiments, user specified criteria may be selected from one or more of renderable media content names, director names, actor/actress names, show class, keywords, and rating information and/or user provided preference rating information of previously utilized renderable media content. In related embodiments, the methods further comprise allowing the user to review and edit renderable media content selected for recording. Further, the criteria for recording of renderable media content can be presented to the user in a list for selection, such as, for example, an alphabetical list or list by genre. The methods of this and other aspects can further comprise allowing a user to preview a list of renderable media content selected for recording, as well as allowing the user to edit the list of renderable media content selected for recording.

In certain other embodiments, the methods further comprise recording from a default channel when no renderable media content has been selected for recording, and recording renderable media content comprises recording onto a randomly accessible recording media, such as a hard disk. In other embodiments, the methods further comprise the user selecting functions from one of play, rewind and fast forward while the selected shows are being recorded. In still other embodiments of the invention, the recorded renderable media content can be stored so that it is available when the guest next stays at an enterprise utilizing the systems of the invention.

In an ninth exemplary aspect of the invention a method for recording renderable media content for time-shifting on a system of the invention is provided comprising reading a guest's user profile from a user profile server to specify criteria for recording renderable media content on a media device; recording one or more user profile-compatible shows, and updating the content registry on the first platform and second platform to reflect the recorded media content. In related embodiments, the user profile meta-data can be compared to one or more of renderable media content names, director names, actor/actress names, show class, keywords, and rating information. User profile meta-data can include preference rating information from previously utilized renderable media content, and methods of the invention further comprise allowing the user to review and edit renderable media content selected for recording according to the user profile. Such editing is made simple because the user profile meta-data utilized for recording of renderable media content can be presented to the user in a list for editing. In other embodiments, the user profile meta-data utilized for recording of renderable media content can be presented to the user in an alphabetical list. Methods of this and other aspects of the invention can further comprise allowing a user to preview a list of renderable media content selected for recording according to the user profile, and in some embodiments further comprising allowing the user to edit the list of renderable media content selected for recording according to the user profile. In further embodiments, the methods further comprising recording from user profile-compatible default channel, and recording user profile-compatible renderable media content can comprise recording onto a randomly accessible recording media, such as a hard disk. In these methods, the user can optionally select functions from one of play, rewind and fast forward while the selected shows are being recorded. In other embodiments, the recorded, user profile-compatible renderable media content is stored so that it is available when the guest next stays at an enterprise utilizing the systems of the invention.

In a ninth exemplary aspect of the invention a method for providing media content to a media device using a computer network is provided comprising receiving a request on a media device from a user or user profile to obtain media content; contacting one or more content sources selected from the group consisting of a content provider operatively connected to the Internet, a local media servers, a media server operatively connected to the Internet, a local media client and a media client operatively connected to the Internet with the request for media content; providing a unique identifier to the content source; and receiving media content. In certain embodiments, the computer network is the Internet.

These as well as other aspects and advantages will become apparent to those of ordinary skill in the art by reading the following detailed description, with reference where appropriate to the accompanying drawings. One of ordinary skill in the art will appreciate that this summary is intended to provide a brief overview of some of the embodiments of the present system, and it is not intended to be an exhaustive or exclusive. The scope of the invention is to be determined by the attached claims and their equivalents.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood that the present invention may be practiced without these specific details. In other instances, well-known methods, procedures, components and circuits have not been described in detail, so as not to obscure the present invention.

Furthermore, additional implementation details for features described below may be found in the following pending patent applications and issued patents, all of which are incorporated herein by reference:

"Video Data Recorder With Integrated Channel Guide," U.S. Pat. No. 6,324,338, Filed Nov. 27, 2001;

"Method and Apparatus For Fast Forwarding and Rewinding in a Video Playback Device," U.S. Pat. No. 6,360,053, Filed Mar. 19, 2002;

"Pay Per View Architecture Providing For Local Storage of Content," U.S. patent application Ser. No. 09/412,992, Filed Oct. 5, 1999;

"Apparatus For Viewing Television with Pause Capability," U.S. patent Ser. No. 10/396,229, Filed Mar. 24, 2003;

"Network Video Unit,"
U.S. patent application Ser. No. 10/215,904, Filed Aug. 9, 2002.

"Methods and Apparatus for Distributing Media in a Pay Per Play Architecture with Remote Playback,"
U.S. patent application Ser. No. 10/622,146, filed Jul. 16, 2003.

1. Overview

Figure 1:
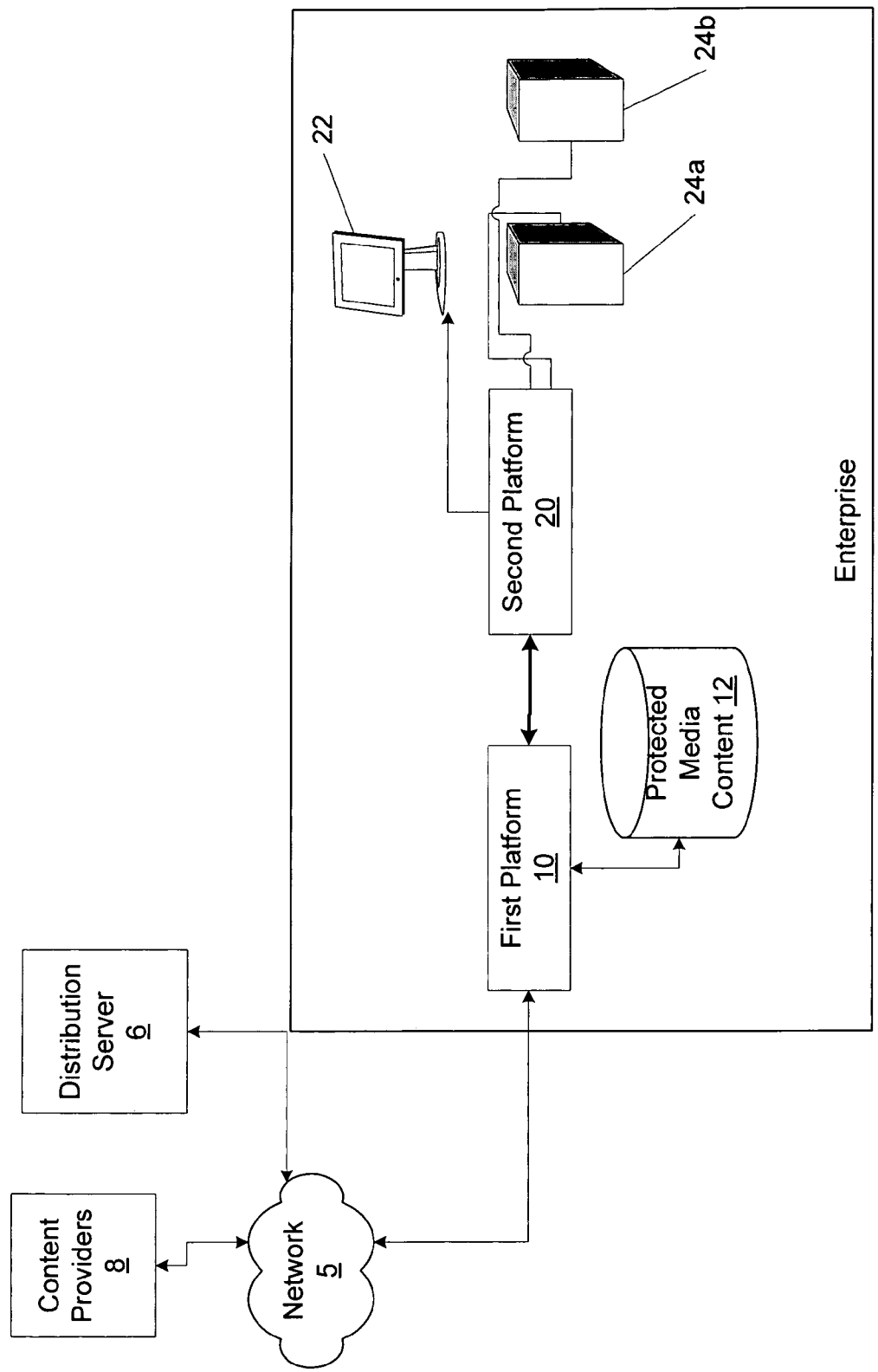
FIG. 1 is a block diagram illustrating a pay-per-view/pay-per-play system in accordance with an exemplary embodiment of the invention.

FIG. 1 depicts operation of an exemplary embodiment of a system for rendering media content comprising a first platform 10 and a second platform 20 cooperatively operating within an enterprise. The first platform 10 receives and then stores media content in an unrenderable state where appropriate. The unrenderable media content comprises content having digital rights associated with it, and is therefore unrenderable in that it is disabled from viewing until purchased by the viewer. The first and second platforms cooperatively provide an interface for purchasing a right to render the stored, unrenderable media content. For example, a guest may purchase protected media content stored at the first platform 10 via a user interface at the second platform 20. The user interface may present the viewer with a list of media that is available for purchase, along with the status of media that has been purchased already.

The second platform 20 is communicatively coupled with the first platform 10 to facilitate rendering of the stored media content. The unrenderable media content becomes renderable, upon purchase by the guest. Preferably, the process of making media content renderable upon purchase by the guest involves decryption, or any other suitable scheme. For example, the media content may be password protected, or made unrenderable by another scheme performed by the media content provider. A preferred scheme for making media content renderable would involve collaboration with the content providers to ensure that the media content may be made viewable by the guest that purchases the rights to it, but remains protected from unauthorized copying at all times.

In an exemplary embodiment, the system of FIG. 1 advantageously permits a guest to have content "pushed" to the system for later viewing, particularly in response to a user profile. The system may be used as a pay-per-view and/or play platform to permit guests to purchase and then view content that has been downloaded for purchase. The system may also be used as a Personal Video Recorder (PVR) to permit guests to view and record, for time-shifting purposes, content that does not require purchase. When the guest selects content to view and it is in an unrenderable state, at least one of the first platform and the second platform may be used to convert the stored media content to a renderable state in response to the purchase of the right to render such content.

The media content systems of the invention advantageously allow an enterprise to configure a completely personalized entertainment system for its guests. The enterprise and its guests may receive content from a plurality of content providers 8 connected to the user's system via a network 5. The content providers 5 may provide protected or unprotected audio, audio/visual, or any other type of media for download over the network 5. A distribution server 6 may monitor downloads as an intermediary between the content providers 5 and the system. The distribution server 6 may receive requests for content, requests to search for content, information about the content available from the content provider and information about the user. Responsive to the requests, the distribution server 6 may retrieve content from the content providers 5 and make it available to the enterprise and its guest. The enterprise and its guests may, however, search for and retrieve content independently of any distribution server 6.

In exemplary embodiments, the distribution server 6 may communicate with either the first, second or both platforms 10, 20 in the system to authenticate and track the usage, payment, and commerce of the content. The distribution server 6 also may interface with a service provider's accounting system to obtain and use information about the users of the system.

The system in FIG. 1 may take a wide variety of forms many of which are described in further detail below. One of ordinary skill in the art will appreciate that the following describes examples of alternative embodiments and that other examples may fall within the scope of the appended claims.

In addition, the following description makes reference to a system that provides pay-per-view (PPV) of audio/visual content such as movies. Embodiments of the system below, however, also provide pay-per-play options for enterprise guests who wish to purchase music from networked content providers and pay to listen to audio content for a limited time. One of ordinary skill in the art will appreciate that the terms "pay-per-play" or "PPPlay" shall be understood to encompass systems that permit the purchase of both audio-visual content and audio content, or any other content that guests may desire to obtain with such a system. Such content would include without limitation movies, television programs, live or not-live telecasts of events such as sporting events, music performances, music recordings, or other multi-media or single media content such as games.

In addition, one of ordinary skill in the art will appreciate that the term "pay-per-play" or "PPPlay" is not limited to any particular type of transaction. For example, PPPlay encompasses a transaction in which a guest may download media content and pay for its viewing, whether once or another fixed number of viewings. PPPlay also encompasses transactions based on a subscription service. For example, a guest may subscribe to a service that provides media to the guest for viewing during a period of time. The media may be downloaded to the first platform 10 in an unrenderable state. The guest's subscription may provide the mechanism in the system to purchase the media and thereby make the media renderable. The media may be maintained in its renderable state for a limited period of time after which it becomes unrenderable. Other examples of subscription services may also be implemented.

2. An Exemplary Embodiment of a System for Rendering Media Content

Figure 2:
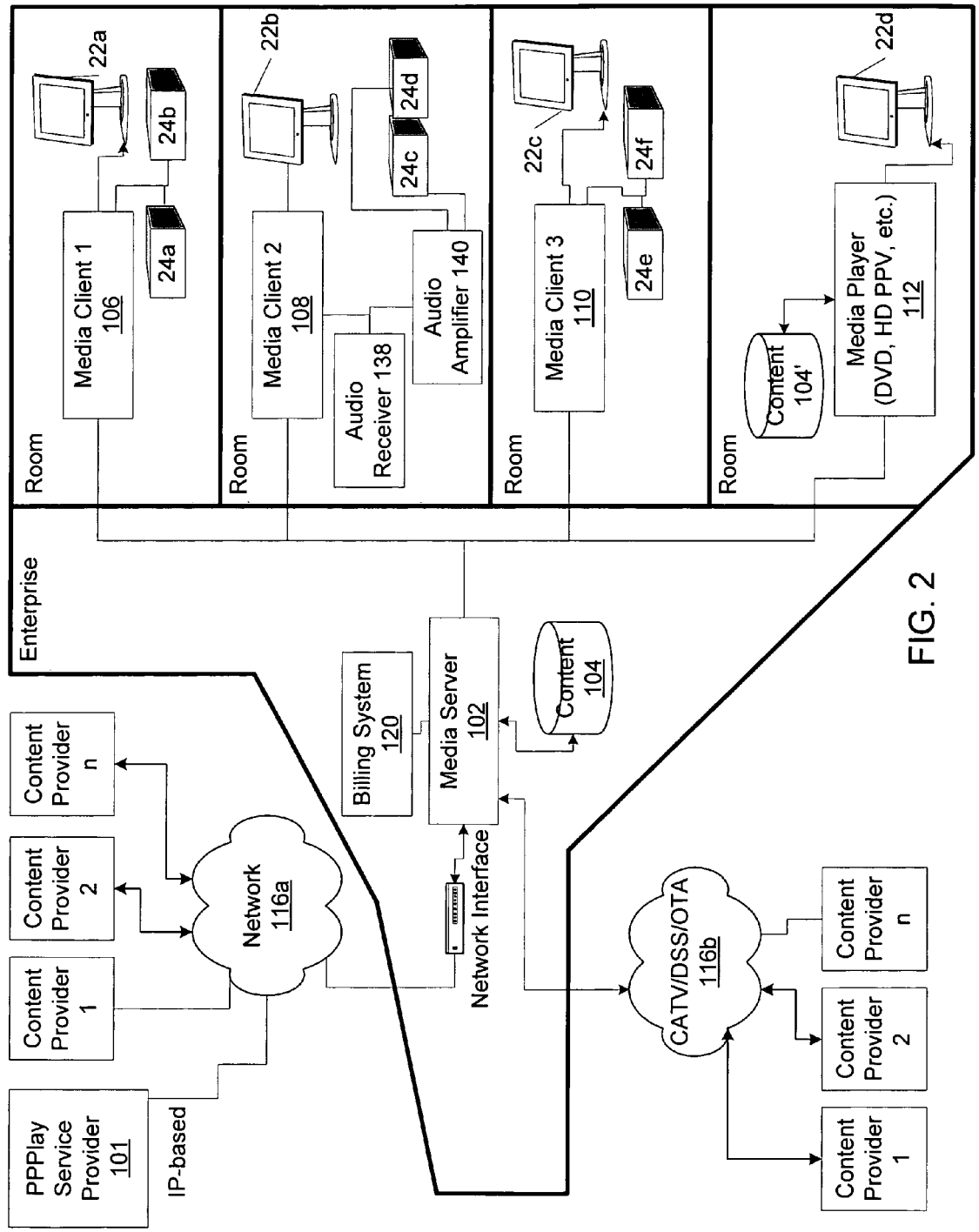
FIG. 2 is a block diagram illustrating a pay-per-view/pay-per-play system in accordance with another embodiment of the invention.

FIG. 2 depicts operation of another system for rendering media content in accordance with an embodiment of the invention. The system of FIG. 2 comprises a first platform in the form of a media server 102, which stores media content that may be rendered by the system. The media server 102 receives media content in either a renderable or an unrenderable state and stores that content on a content storage device 104 coupled to the media server 102. The storage device 104 is shown in FIG. 2 as a separate component. However, it will be appreciated, the storage device 104 may be included in the media server 102.

Whether media content is in a renderable or unrenderable state is dependent upon the extent to which the content provider requires digital rights management (DRM) for the content. The media server 102 may receive content that is broadcast by a broadcast network or by a content distributor (e.g. CATV distributors such as HBO®) and intended for instant viewing upon receipt. Such content may be free as being broadcast over the air by public broadcasters, or it may be part of content that comes with purchased access. For example, a guest may subscribe to HBO® as part of a cable package and media content received via an HBO® channel would be received by the media server 102 in a renderable state. In the case of a hospitality or hotel (or "enterprise")-based system, the enterprise may subscribe to HBO® as part of a cable package and media content received via an HBO® channel would be received by the media server 102 in a renderable state. Such renderable content can be directed to the media client 106, 108, 110 in each room in a renderable state if unrestricted access to the content is desired. When the enterprise charges for access to such specialty content in a pay-per-view or pay-per-play scenario, said content can be selectively directed in a renderable state to only the media clients (e.g., 106, 108, 110) of guests who have paid for access to said content. Alternatively, the media server 102 can convert the renderable content to unrenderable content, broadcast the unrenderable content to all media clients 106, 108, 110 in the enterprise. Only those media clients in rooms whose guests purchase access to the specialty content can convert the unrenderable content to renderable content. Even greater DRM protection can be provided when the media server 102 selectively directs the specialty content in an unrenderable state to only the media clients 106, 108, 110 of guests who have paid for access to said content. Only the media clients that both receive the unrenderable content and means to convert the content into renderable content (e.g., an encryption key obtained upon purchase of the specialty content) allow viewing of the specialty content.

The media server 102 may also receive content in an unrenderable state that would require the guest to purchase in order to become renderable. Such content may be purchased as pay-per-view (or pay-per-play), or as part of a subscription service. In a pay-per-view/pay-per-play scenario, the guest may receive media content through a discovery process initiated by a discovery service in the first or second platforms or by a service distributor (e.g. the content for pay service provider 101 described below) accessible via a data network 116a. The discovery process may be completely automated using a set of user preferences set or configured by specific users of the service, or it may be performed using manual content searches. In enterprise embodiments, the discovery system can also be triggered to automatically act according to a user profile that maintains the content preferences of the user (i.e., hotel guest), as well as other content-related parameters such as accumulated content access. Accumulated content access represents, for example, prepaid access to content, such as movies or subscription services, paid for by the guest or provided by the enterprise as a reward, inducement, of gift, the status of which is maintained by the enterprise and travel with the guest. The discovery process searches and receives media content in an unrenderable state to be made renderable upon purchase by the guest. The process for converting the media content to an unrenderable state and then to a renderable state would preferably require a collaboration between the content for pay service provider and the content provider.

In a subscription service, a user may order media content for a period of time and the media content may be available for rendering only in that period of time, for example the length of their stay with the enterprise. In a subscription scenario, media content may be stored on the media server 102 in either a renderable or an unrenderable state. Preferably, the media server 102 would receive the content in an unrenderable state, but provide the guest with the option with purchasing it to make it renderable and continue to store the media content in a renderable state for the allotted time period. Upon expiration of the time period, the media content would then become unrenderable. Alternatively, the content can be transferred from the media server 102 to the media client 106, 108, 110 in the guest's room in an unrenderable state. Upon purchase, the media would be converted into a renderable state for the allotted time period. Upon expiration of the time period, the media content would then become unrenderable once again on the media client 106, 108, 110.

The media content may be stored in the system of FIG. 2 by employing the storage device 104 and, further, the media content may be stored in a compressed format. In this regard, the media content may be stored in a format that is in accordance with one of the MPEG-1, the MPEG-2 and the MPEG-4 standards. As another alternative, the media content may comprise audio content that exists in a compressed format in accordance with layer 3 of the MPEG-1 standard. The media content may also be stored as encrypted versions of files that have been compressed in accordance with MPEG-based standards, or any other suitable standard.

Examples of suitable compression technologies that may be implemented for video include without limitation: MPEG-1, MPEG-2, MPEG-4, MJPEG, wavelet based compression technologies, H.264, H.261, H.263, DV, MOV, AVI, Windows Media, Quicktime, RealMedia, and encoding and compression based on 3D algorithms and object based algorithms (VP6 from On2, for example). Examples of suitable compression technologies that may be implemented for audio signals include without limitation: MPEG-1 layer 2 (Musicam), MPEG-1 layer 3 (MP3), OGG (Ogg Vorbis), WAVE, WMA, PCM, ITU G.711, RealAudio.

As briefly mentioned above, the system of FIG. 2 also comprises a plurality of media clients 106, 108 and 110 that are communicatively coupled with the first platform for rendering the stored media content. The media clients may take any number of forms, as will be discussed in further detail below, and one or more can be located in each guest room of a hospitality enterprise. The system of FIG. 2 further comprises a media player 112 that is also communicatively coupled with the media server 100. The media player 112 may take the form of a multiple format DVD player, a digital video recorder, or a networked video unit, among numerous other devices. Of course, the invention is not limited to the use of any particular device. The system of FIG. 2 also comprises a portable music player 114, which is coupled with the media server 102 or a media client 106, 108 and 110. The portable music player may comprise a player that renders MPEG-1 layer 3 audio files, for example.

The media server 102 shown in FIG. 2 cooperatively (along with the media clients 106-110 and/or the media player 112) provides the user with an interface for purchasing a right to render the stored media content at least one time. Further, alternative embodiments for converting the stored unrenderable media to renderable media may be used. The media server 102, the media clients 106-110 and the media player 112 may all be made operable, alone or in combination, to convert the stored media content to a renderable state upon the purchase of the right to render that content.

As illustrated in FIG. 2, the media server 102 stores content for which a user may purchase the right to render. That content, which is preferably in an unrenderable state, and is stored, for example, on the content storage device 104. The storage device 104 may comprise a hard drive that is included in a digital video recorder, a personal computer, or a file server, as some examples. In these scenarios, the digital video recorder or the personal computer may function as the media server 102. For the scenario where the storage device 104 is included in a file server, the media server 102 may take the form of a client computer coupled with that file server. Similarly, the Content Providers (CPs 1 through "n") store content for which a guest can purchase the right to render. The interface for purchasing a right to render the stored media content includes not only the content of the media server 102, media client 106-110 any content storage device 104 associated therewith, but access to content stored by the CPs. That content, which is preferably in an unrenderable state, can be transferred across the network 116a from the CP to the media server 102 and finally to the media client 106-110 associated with the guest who purchased the right to render. Content selected from the CPs and transferred to the enterprise can be stored on the media server 102, media client or any content storage device 104 associated therewith.

In an alternative embodiment, the storage device 104 may comprise an optical storage device, such as a digital versatile disk (DVD) drive. Such a DVD drive may be included in a personal computer, or as a peripheral device in a digital video recorder, as some examples. The DVD drive may be a read only drive or may be a DVD read-write (R/W) drive. For read only drives, the protected media content may be included on a DVD that is placed into the DVD drive by a guest. Such a disk may be delivered to the guest as part of a service through the enterprise. Alternatively, where the DVD drive(s) are accessible only by enterprise staff, the DVD can be loaded by, for example, enterprise personnel, the content of which can be delivered in renderable or unrenderable form to one or more media clients complimentary or for a fee. For R/W drives, the protected media content may be delivered to the system using, for example, the techniques described below, and written to a DVD using the R/W DVD drive. As shown in FIG. 2, the system includes a plurality of content providers 1 through "n" and $1_a$ through $n_a$. Content providers 1 through n are coupled with a first distribution network 116a. For this embodiment, the first distribution network 116a may comprise a packet-based network such as, without limitation, an Internet Protocol (IP) network that may be coupled with the Internet, as an example.

The content providers $1_a$ through $n_a$ are coupled with a second content distribution network 116b. The second content distribution network 116b may comprise a broadcast network, such as a cable television (CATV) system, a digital satellite system (DSS), or an over-the-air (OTA) system, such as a traditional broadcast television system (NTSC), a high-definition broadcast television system (ATSC), or radio (terrestrial analog, terrestrial digital, and satellite digital). In this regard, it is to be understood that media content herein refers to any audio, audio-visual, or visual media. Such content may come in the form of music, vocal works such as speeches, or any audio work, as well as movies, television programs, videos, video games, or moving pictures of any kind, or as photographs, photo albums, slideshows, or any other pictures as single images or collections of single images.

Enterprises and by extension their guests can have their access to the content providers managed by a content for pay service provider 101 that is accessible preferably over the data network 116a. The content for pay service provider 101 may be a distribution server as described above with reference to FIG. 1. The content for pay service provider 101 may provide users with a central location for configuring discovery options, managing accounts, obtain billing support, etc. The content for pay service provider 101 may maintain an interface to the content providers used to obtain service. When the enterprise's system performs discovery of content (for example, a media server 102 or a media client 106-110), the PPPlay service provider 101 may operate as an intermediary by connecting to appropriate content providers.

Additionally, as was indicated above, PPPlay media content for the system of FIG. 2 may be provided via physical media that is introduced into the system using, for example, a DVD drive. Based on the foregoing, it will be appreciated that various methods for delivering content on a pay-per-view basis exist and that the invention is not limited in scope to the use of any particular technique. It is noted that the foregoing approaches are exemplary, and any number of content provider configurations may be used. For example, a single content provider may be used to provide media content to such a media rendering system.

The media content may reside on a content storage device 104, a media server 102 or a media client 106-110 in an renderable or unrenderable state, preferably unrenderable. The unrenderable state may be implemented using a variety of techniques that exist for protecting such media content from unauthorized use. For example, various file-locking techniques may be used, such as password protection, or other such techniques. Further, encryption and/or the use of digital signatures may be used to protect such content. In an exemplary embodiment, the protected state implementation may evolve by agreement between a service provider and the content provider. The system of FIG. 2 may be required to support different implementations for an unrenderable state.

In the system of FIG. 2, multiple levels of protection may be used at different places in the system to protect the media content from unauthorized viewing and/or playback. In this respect, for certain embodiments, the media content stored in the system of FIG. 2 may comprise a first level of encryption that protects the media content from unauthorized rendering. Depending on the particular situation, this encryption may be implemented by one of the content providers or by an operator of the content distribution network (e.g., the network 116a or the network 116b). Further, the media content may comprise a second level of encryption that protects the media content from unauthorized reception and storage. The second level of encryption may comprise a form of encryption that is implemented by a CATV provider or a DSS provider to protect content they broadcast from being received and used by unauthorized devices. Collectively, any source for media content is known as a "content source" herein. Content providers 1-n, 1a-na, media servers and media clients can all serve as content sources to other media servers or media clients that need any media content stored thereon. Even media servers and media clients in other enterprise locations (for example, remote locations of a hotel chain) can serve as media sources for media clients and media servers in another enterprise location.

In exemplary embodiments, the unrenderable state may involve implementing an encryption algorithm based on encryption technologies such as AES, DES, 3DES, as well as any suitable private or public key cryptosystem.

The media server 102 may comprise a dedicated media storage and serving device, such as a specially designed platform for receiving, storing and managing media content. Alternatively, the media server 102 may comprise a first device that stores media content (such as the content storage device 104) and a second device that manages the media content (such as a personal computer coupled with the first device). In such alternative configurations, the first device may comprise a digital video recorder, for example.

The system also comprises one or more rendering/display devices. For example, the system 100 comprises plural video display devices and audio speakers 24a-f. The video display devices 22a-d, depending on the particular embodiment, may comprise a video processing unit, a standard television display, a high-definition television display, a flat panel display, among numerous other possibilities. The speakers 24a-f may comprise passive or active speakers (which may depend on the particular type of media client). As another example of a media-rendering device, the media client 108 comprises a digital audio receiver 138. The media client 108 is also coupled with an audio amplifier 140, which may be used to render digital audio (media content) using the speakers 24a-f coupled with the audio amplifier 140 after the digital audio content is decoded by the digital audio receiver 138. Other media rendering systems may include headphones, portable LCD video and audio players.

3. First Platform

Figure 3:
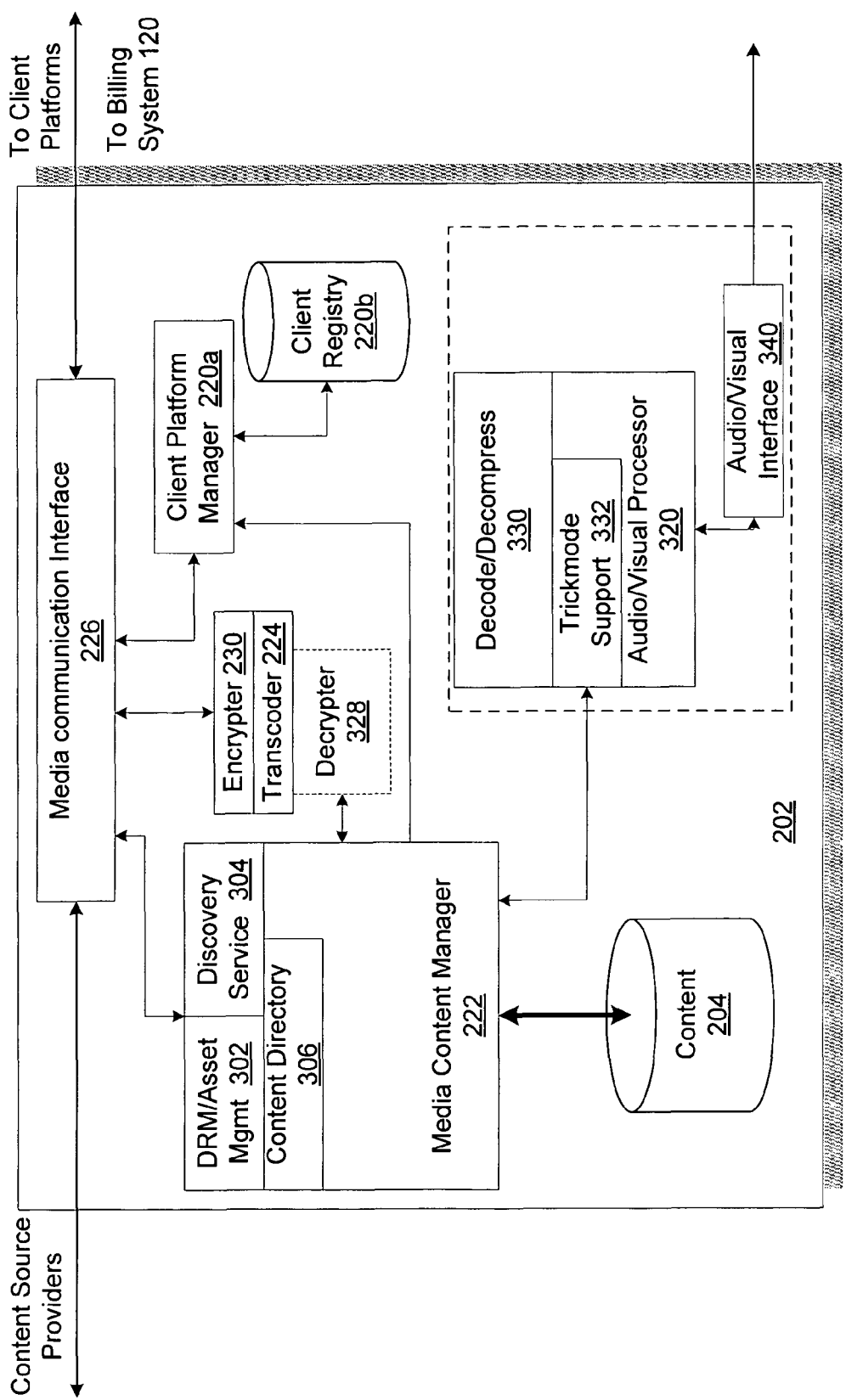
FIG. 3 is a block diagram illustrating a first platform for use in the pay-per-view/pay-per-play system of FIG. 1.

The media server 102 has been described above with reference to FIG. 2 as one example of the first platform shown in FIG. 1. FIG. 3 is a more detailed depiction of a media server 202 in accordance with an exemplary embodiment. The media server 102 shown in FIG. 3 comprises a client platform manager 220a, a client registry 220, a media content manager 222, a transcoder 224, a media communication interface 226, a decryptor 328, and an encryptor 230.

The media server 202 includes a media communication interface 226 to provide communications capabilities with content source providers and with the media clients 106, 108, 110, 112. With respect to communications with content source providers, the media communication interface 226 implements an IP-based interface using cable, DSL, or other suitable connection to communicate with data network connected providers. The media communication interface 226 may also implement suitable hardware and software to communicate with CATV, DSS and/or broadcast television providers.

To communicate with the media clients 106, 108, 110, 112, the media communication interface 226 may comprise a router or hub to connect to a local network (such as a enterprise IP-network) that is used, in part, to communicate media content from the media content storage device 104 (or the media server 102) to at least one of the media clients/players or from the content provider through the media server 102 to at least one of the media clients. The media communication interface 226 may also be employed as an in-enterprise data network for communicating between various electronic devices in the enterprise, such as for providing access to the Internet, for example. The media communication interface 226 may be wired or wireless and may communicate on a broadcast, peer-to-peer, or access point scheme. In an exemplary embodiment, the media communication interface 226 comprises a wireless Ethernet access point using for example, a standard IEEE 802.11 wireless network. One of ordinary skill in the art will appreciate that the specific chosen media communication interface 226 is not critical and that any suitable media communication interface 226 may be used.

The media server 202 in FIG. 3 includes software and/or firmware for managing the operation of the system 100. In this regard, the media server 202 implements a client platform manager 220a to manage media clients on the network, including tracking the content purchase history on each media client 106-112 for communication to the billing system 120, for example, through the media communications interface 226. The media server 202 also comprises a client registry 220b that contains a listing of the media clients 106-110, the media player 112 and the portable music player 114, along with one or more parameters corresponding with functional attributes of each of these platforms. The client registry 220b is employed by the media server 102 (and the system 100) to determine what types of media content each of the clients/players is capable of rendering, so as to only provide compatible media to these clients/players for viewing/playback. The client platform manager 220a preferably implements an automated client discovery function that connects to the network and detects when the enterprise has added another media client. The client platform manager 220a may then poll the new media client for information to add to the client registry 220b. In a preferred embodiment, the media server 102 and the media clients 106-114 use the SSDP/uPnP (Simple Service Discovery/Universal Plug n' Play) to discover other media clients. The media server 202 also comprises software, hardware and/or firmware that implements a media content manager 222. The media content manager 222 includes a discovery service 304, which accesses media content by communicating with content providers over the chosen network. Content may be discovered by the discovery service 304 using a variety of techniques. For example, the discovery service 304 may implement a search for user-provided titles, or for content based on search criteria, such as movies starring particular actors/actresses. The discovery service 304 may also implement a user profile-based search for content. User profiles may be developed over time according to types of specific content that is requested over time, or they may be built from responses to user prompts.

The media content manager 222 also includes a digital rights management and asset management function 302 to manage monitoring and purchasing rights to render the stored media content as well as enforcement of digital rights associated with the media content. Such digital rights may include copyright protections, number of playback cycles that an enterprise or a specific guest may perform, among any number of other digital rights associated with the purchased right to render the media content. These digital rights may be included in a data file along with the media content, such as in an attributes portion of the data file. In this respect, meta-data (or meta-tags) may be employed to provide the digital rights associated with the media content along with the media content itself.

The digital rights management and asset management function 302 additionally includes logic for controlling the rendering of media content in correspondence with the terms of the purchase of the right to render the media content (including the digital rights). Such terms may include the number of times a specific item (e.g. movie, music selection, etc.) may be rendered, what type of device may be used to render the content (e.g., no portable players, only high-definition displays, etc.) and whether rendering is limited to a single device or if multiple devices may be used, as some examples. It will be appreciated that any number of techniques for controlling the rendering of media content and enforcing digital rights associated with that content are possible. The specific techniques employed depend, at least in part, on the particular embodiment. The invention is, of course, not limited to the use of any particular techniques for implementing such software, hardware and/or firmware.

The media content manager 222 also includes a content directory function 306 operable to generate a user interface on either the media server 202 or on one of the clients 106, 108, 110 and 112. The content directory function 306 preferably communicates with the discovery service 304 (which accesses media content by communicating with content providers over the chosen network) and the asset management function 302 to determine and report the status of each piece of media content available for purchase or for viewing. The content directory function 306 may also communicate with content directory functions on the media clients 106, 108, 110, 112 to display narrower directory content focusing on the interests of guests, for example, according to their user preference profile.

The media server 202 also includes a transcoder/transrater (transcoder) 224. The transcoder 224 is employed to translate media content from a first format to a second format. In this regard, media may be received in a first format, such as MPEG-2 format. The media server 202 may then transcode the media content to a different format, such as MPEG-4, for example. This transcoding may be performed due to the functional capabilities of a media client, as defined by one of the client registry 220 attributes of the client/player to which the media server 202 communicates the media content. For example, the media client 106 may comprise a low-bit rate media-rendering device that is not capable of rendering an audio/video stream in MPEG-2 format. Therefore, in this particular situation, the media server 202 may transcode the media content (using the transcoder 224) to MPEG-4 format to provide a lower bit rate media stream to a media client 106.

As an alternative, a transrater may be employed to modify the bit-rate of the media content without modifying the encoding technique implemented.

Transcoding/transrating may also be used to reduce the amount of bandwidth used on a media communication interface 226 included in the media server 202 when communicating with the media clients/players over a network. Transrating may reduce the bit rate of media content communicated over the network 126 and may thereby improve the efficiency of the network.

The media server 202 may also optionally comprise a decryptor 328. The decryptor 328 may comprise hardware, software and/or firmware to decrypt multiple levels of encryption used to protect the media content. In this regard, the decryptor 328 may decrypt a first level of encryption applied to the media content to protect the media content from unauthorized reception and/or storage when such content is received from a content distributor, such as via the network 116a or the network 116b (See FIG. 2). Such decryption may be related to a transmission protocol implemented by a content distributor.

Further, the decryptor 328 may decrypt a second level of encryption applied to the media content. This second decryption operation may be related to the prevention of unauthorized viewing/playback of the media content. Thus, the second decryption is typically performed in response to the purchase of a right to render the media content, as has been previously described. This is a desirable approach as the media content remains in an encrypted state until the right to render that content has been purchased. Once the second level of encryption is removed, the media content may be said to be in a renderable format (or is renderable content). The renderable content may then be rendered using the media server 202 by employing a rendering device (not shown) coupled with the media server 202. Alternatively, the media content may be communicated to one of the media clients (106-110), one of the media players (112 and 114) or a content storage 104 coupled thereto, coupled with the media server 202. As was mentioned above, the media content may be transcoded or transrated prior to being communicated from the media server 202 to one of the media clients/players.

In addition to being transcoded or transrated, the renderable media content may also be encrypted again (using an encryptor 130 included in the media server 202) prior to communication of the renderable content to one of the media clients/players. The encryptor 230 may apply, for example, public/private key encryption to a media stream signal. In this respect, the encryptor 230 may apply encryption to the media stream signal using a public key corresponding with the media client 108. The encrypted media stream signal may then be communicated to the media client 108 and decrypted using a decryptor 232 with a private key of the media client 108. Such a configuration protects the media content from transmission to an "untrusted" client/player device, which, in turn, prevents unauthorized use of the media content. When the media stream is decrypted, it is then be decoded by employing the decoder 330 and rendered using a rendering device, as described in more detail below.

In exemplary embodiments, the media server 202 may optionally provide direct rendering capabilities and may further include an audio/visual interface 340. The audio/visual processor 320 may further include a decoder/decompressor 330, and a trickmode support function 332. The decoder/decompressor 330 may be implemented to convert the content format to a format suitable for display. The trickmode support function 332 may be used to allow the user to reverse, pause, fast forward, stop, etc. the content being displayed according to the user's convenience. In this way, the trickmode support function 332 may interface with a remote control device or with a front panel interface.

One of ordinary skill in the art will appreciate that FIG. 3 depicts one example of the media server 202 and that others may be possible.

4. Second Platform

Figure 4:
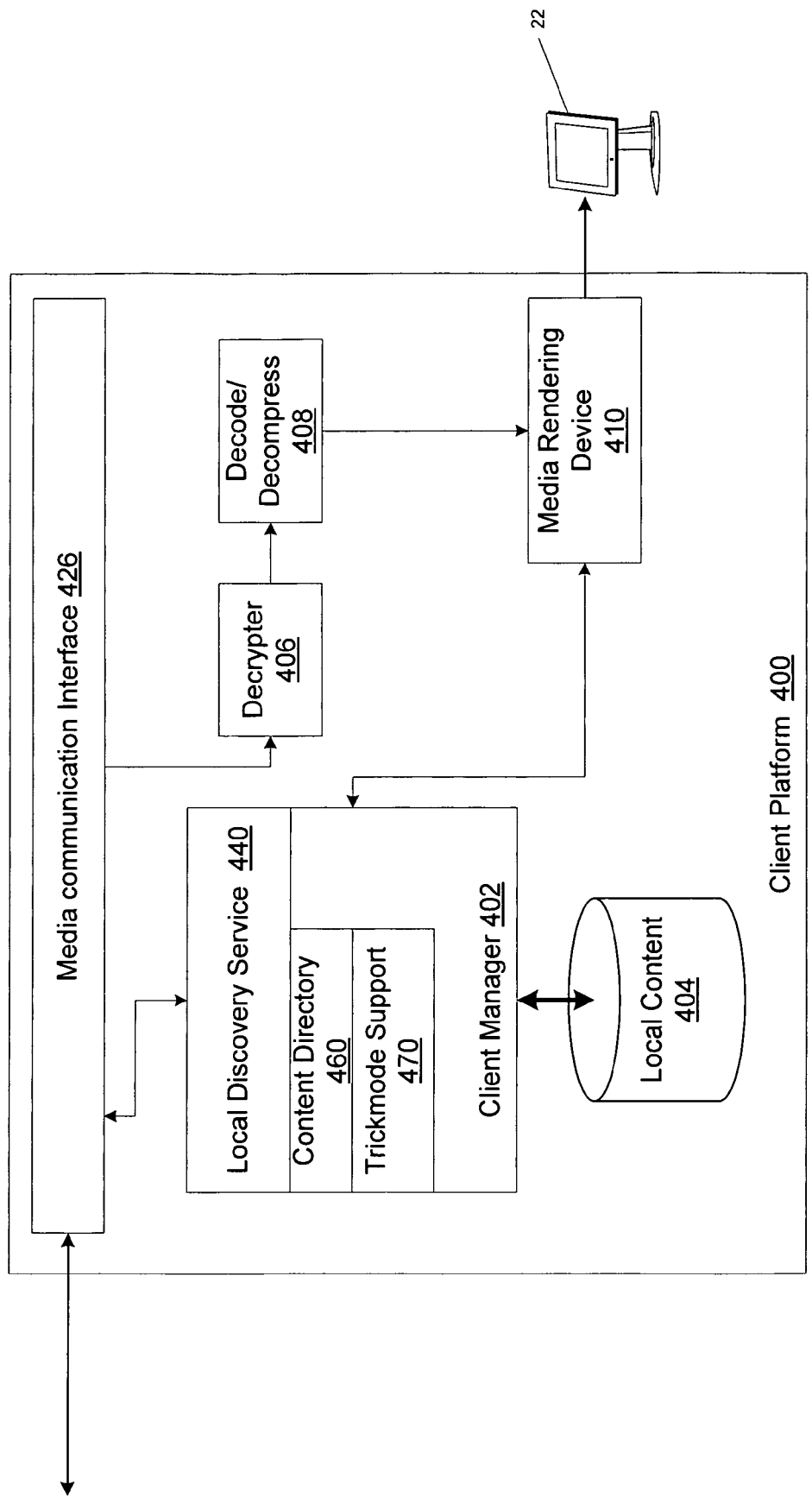
FIG. 4 is a block diagram illustrating a second platform for use in the pay-per-view/pay-per-play system of FIG. 1.

Referring back to FIG. 1, the media client 106 provide a guest with the ability to access the media content stored on the media server 102 or content provider 1-n, 1a-na. FIG. 4 is a more detailed depiction of a media client 400 in accordance with an exemplary embodiment.

In the system shown in FIGS. 1 and 2, the media clients 20 and 106 are primarily responsible for rendering content and in some embodiments, for providing an interface to purchase content stored in the media server 102 or content provider 1-n, 1a-na. The media client 400 in FIG. 4 depicts additional functionality that may be performed by the media clients. The media client 400 in FIG. 4 comprises a client manager 402, a local content storage device 404, a decryptor 406, a decoder 408, and a media rendering device 410. The media client 400 may also include a media communication interface 426 to communicate with the media server 102.

The client manager 402 comprises a local discovery support service 440, a directory content function 460, and a trickmode support function 470. The local discovery service 440 may comprise software, hardware and/or firmware. The media discovery service 440 communicates with the media server 102 via a network interface 426 and the local network to "discover" the composition of the media content stored on the media server 102 (or on the content storage device 104). In addition, the local discovery service 440 can interface with the media content manager 222 of the media server 102. As described above, the media content manager 222 includes a discovery service 304, which accesses media content by communicating with content providers over the chosen network. Content may be discovered by the discovery service 304 using a variety of techniques, for example, the discovery service 304 may implement a search for user-provided titles, or for content based on search criteria, such as movies starring particular actors/actresses. The discovery service 304 may also implement a user profile-based search for content. User profiles may be developed over time according to types of specific content that is requested over time, or they may be built from responses to user prompts. As the media content manager 222 also includes a content directory function 306, which is operable to generate a user interface on either the media server 102 or on one of the clients 106, 108, 110, 112, the media client can also determine and report the status of each piece of media content available for purchase or for viewing on a media client 400, a media server 102 or content provider 1-n, 1a-na. Further, the content directory function 306 may also communicate with content directory functions on the media clients 106, 108, 110, 112 to display narrower directory content focusing on the interests of guests, for example, according to their user preference profile.

Thus, the media client 400 can interface with the media server 102 and access the media available thereon as well as interface, through the media content manager 222 and discovery service 304 of the media server 102, with the PPPlay service provider 101, the content providers 1-n, 1a-na directly, as well as media servers 102 at other enterprise locations (for example different branches of a hotel chain) to discover the composition of media content available. Purchase of rendering rights to media content results in the transfer of the preferable unrenderable media content from a local (or remote) media server 102 or content provider 1-n, 1a-na to the media client 400 for decrypting and rendering for display on a display device 22. The discovery service 440 can also operate in conjunction with a content directory function 460 to provide a listing of the portions of the media content stored on the media client 400, the media server 102 (or content storage device 104) that are available for viewing immediately, or for purchase on a PPPlay basis to become renderable by the media client 400. The directory content function 460 can also contain a directory of content available directly from content providers 1-n, 1a-na obtained, for example, from the media server 102 or PPPlay service provider 101. Such lists may be displayed, for example on the video display device 22 coupled with the media client 400.

The media client 400 may also comprise a trickmode support function 470, which may be included as part of the client manager 402. The trickmode support function 470 provides the guest with total viewing control by providing a Pause, Stop, Rewind, Fast Forward, and other viewing control functions.

The media client 400 additionally comprises a decryptor 404 that, in certain embodiments, may decrypt content that has been encrypted by either the content providers or by the media server 102. The decryptor 404 may decrypt the content on a first level pursuant to a purchase by the guest, or on further levels for the purpose of protecting the signal from being intercepted and used by unauthorized parties.

The media client 400 additionally comprises a decoder 406 that, in certain embodiments, converts the media content stream communicated from the media server from an encoded format to a format that corresponds with the media rendering device (e.g., video display device 134). Decoding of such a media content stream signal typically occurs after the decryptor 132 has decrypted encryption of the media stream.

The media client 400 also comprises a media rendering device 410 to ensure that content is converted to a format that is suitable for display on the display unit 22.

Media content can be transferred to and rendered by a media client associated with the location of media content use. Alternatively, the media content can be rendered by a media server or an alternate media client and delivered to the appropriate guest, fro example on their display device. Further, a single copy of media content can be rendered and delivered asynchronously or synchronously to guest requesting said media content. When resources, for example the computing resources necessary to render and deliver multiple media content streams to the appropriate guest, are limited or pushed to capacity, the media content can be copied and transferred to another media server or media client for rendering. Thus, in certain embodiments, resources are allocated and used in an efficient manner by sharing rendering, encoding, decoding (etc.) resources among the media clients and media servers of the system of the invention.

As was previously indicated, media clients 106-110 may take any number of forms. For example, the media clients may comprise a digital video recorder, a personal audio player, a HD-TV, a multi-format DVD, a digital audio receiver, a video processing unit that performs high performance decryption, decoding and video/audio processing, among any number of other possible media clients.

5. Exemplary Methods for Rendering Media Content

Figure 5:
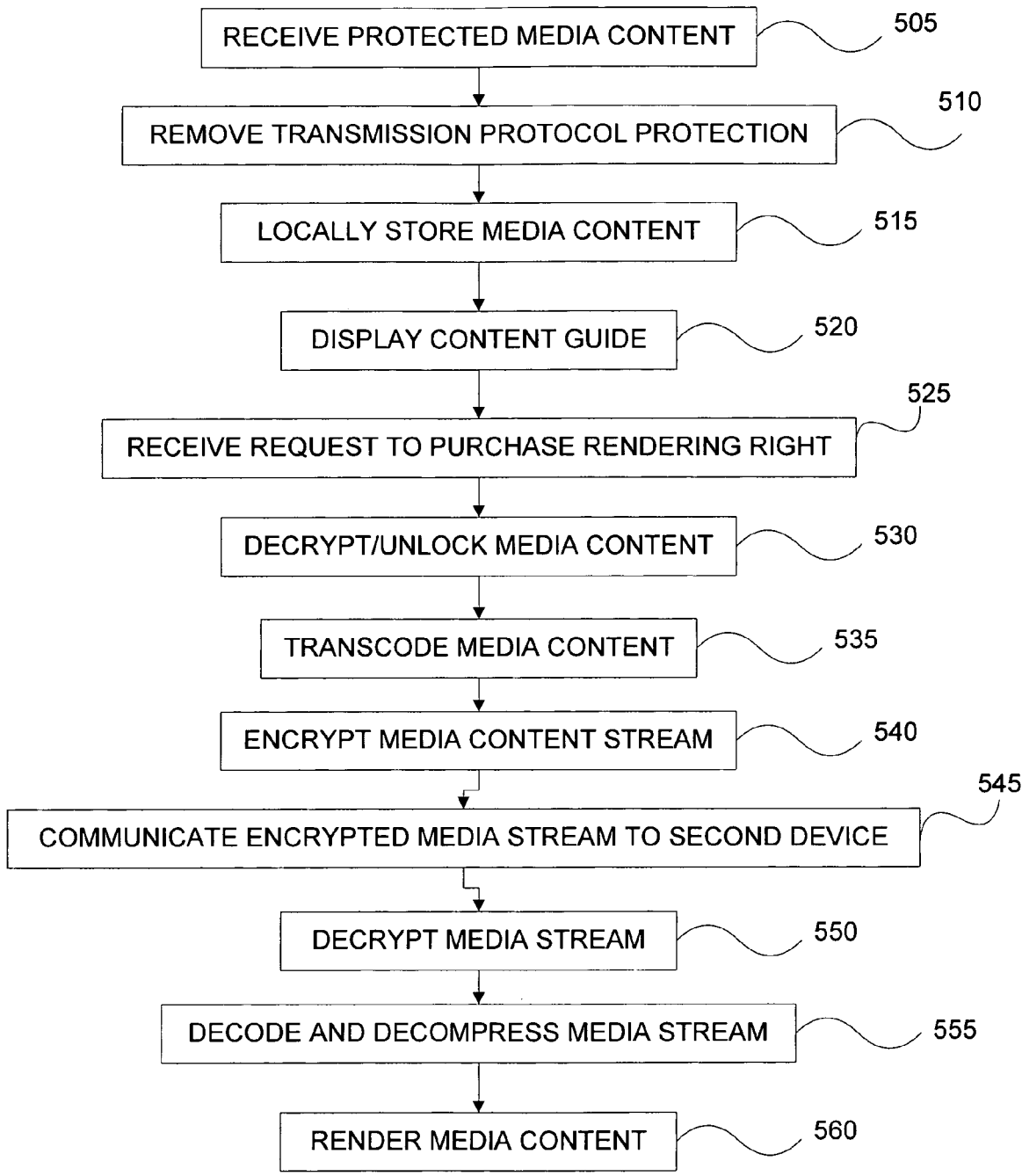
FIG. 5 is a flowchart illustrating a method for distributing pay-per-view/pay-per-play content in accordance with an embodiment of the invention.

Referring now to FIG. 5, a flowchart illustrating a method 500 for rendering media content in accordance with an embodiment of the invention is shown. The method 500 may be implemented using any of the systems described herein, as well as other embodiments of media rendering systems.

The method 500 comprises, at block 505, receiving unrenderable media content. Such media content may comprise various types and/or levels of protection, which protect that content from unauthorized reception and use, as has been previously described. The media content may be audio content and/or audio/video content, for example. Alternatively, the media content may be photographs, or the like. At block 510, a transmission protocol encryption level is removed from the media content. Such a transmission protection level may be implemented by a content distribution service, such as CATV or DSS providers, to prevent unauthorized reception of the media content, as was indicated above. It is noted that the media content for this particular embodiment includes another level of protection to prevent unauthorized rendering of the media content and will be discussed in further detail below.

At block 515, the media content is locally stored. As previously described, the media content may stored using a hard disk drive or may be stored on, for example, a DVD. It will be appreciated that various techniques for storing the media content (which still comprises an unrenderable state) exist. In this regard, while a number of techniques for storing such media content are described herein, the invention, of course, is not limited to any particular technique or approach.

At block 520, a content guide may be displayed on either a first or second device of a media rendering system in which the method 500 is being implemented. Using this content guide, a guest may indicate the desire to purchase a rendering right to view/playback the protected media content (or at least a portion of it), which, in turn, generates a request that may be communicated to and/or received by the first device at block 525. The purchase request may also be communicated to a content provider for billing purposes or, alternatively, to a central accounting server that is maintained by the content distribution service (not shown).

In one alternative embodiment, a content guide can be displayed comprising the media available for immediate viewing or purchase on a media client 106-112, media server 102 or content providers 1-n, 1a-na. The guest can then request to purchase the rendering right to media on the content guide. In the case where media is not available locally, i.e., the guest's choice is of media available from the content provider 1-n, 1a-na and not immediately available on a media client 106-112 or media server 102, the content provider can send the unrenderable media on a network, for example 116a, to a media server 102 or through the media server to the media client 106-112. The transmission protocol protection can then be removed and the media stored locally, either on the media server 102 or media client 106-112.

After a rendering right has been purchased, at block 530, the media content is decrypted (such as by using a private key) or is unlocked (such as through password protection, or the like), such that the media content is available to be rendered. The media content may then be decoded, decompressed and rendered by the first device (a process not shown in FIG. 5). Alternatively, as is shown at block 535 in FIG. 5, the media content may be transcoded to account for one or more playback attributes of the second device (e.g., media client) in a system in which the method 500 is being implemented. In this situation, is it is assumed that the second device cannot efficiently render the media content (or render that content at all). Therefore, the media content is converted from one format (e.g., MPEG-2) to another format (e.g., MPEG-4) to accommodate the capabilities of the second device. Alternatively, the media content may be transrated (e.g., sampled to reduce the bit rate) to reserve bandwidth on a local network used to communicate the media content, or to account for the capabilities of the second device, as was previously described.

At block 540, the media content is placed in an encrypted media stream for transmission from the first device (e.g., a media server) to the second device (e.g., a media client). Various encryption techniques are possible and the invention is not limited to any particular approach. However, as one example, a secure-socket-link type encryption may be used. At block 545, the encrypted media stream is communicated to the second device (e.g., over a network, as have been previously described) and decrypted at block 550. The media content is decoded and decompressed at block 555 and rendered at block 560. The approaches for decoding, decompressing and rendering depend, at least, on the type of media content and the particular system in which the method 500 is being implemented. It will, of course, be appreciated that numerous such approaches are possible.

In certain embodiments, when media content has been purchased from a content provider 1-n, 1a-na, the media content can be downloaded to the media server 606 (FIG. 6) or through the media server directly to the media client 608, 610, the download of the media content preferably need not be completed before it is played on the media client 608, 610 and viewed on a display device 618. The media system of the invention can stream or preferably store the media content as downloaded from the content provider 1-n, 1a-na and make renderable the content downloaded to that point. For example, if the guest selects media content for download from a content provider, the guest can access any portion of the content presently downloaded (in the still active download) such that if he fast forwards the content (a movie for example) to the point of present download, the content will pause. As more content is downloaded, more renderable media becomes available.

6. Exemplary Embodiment with Internet-Based Media Source

Figure 6:
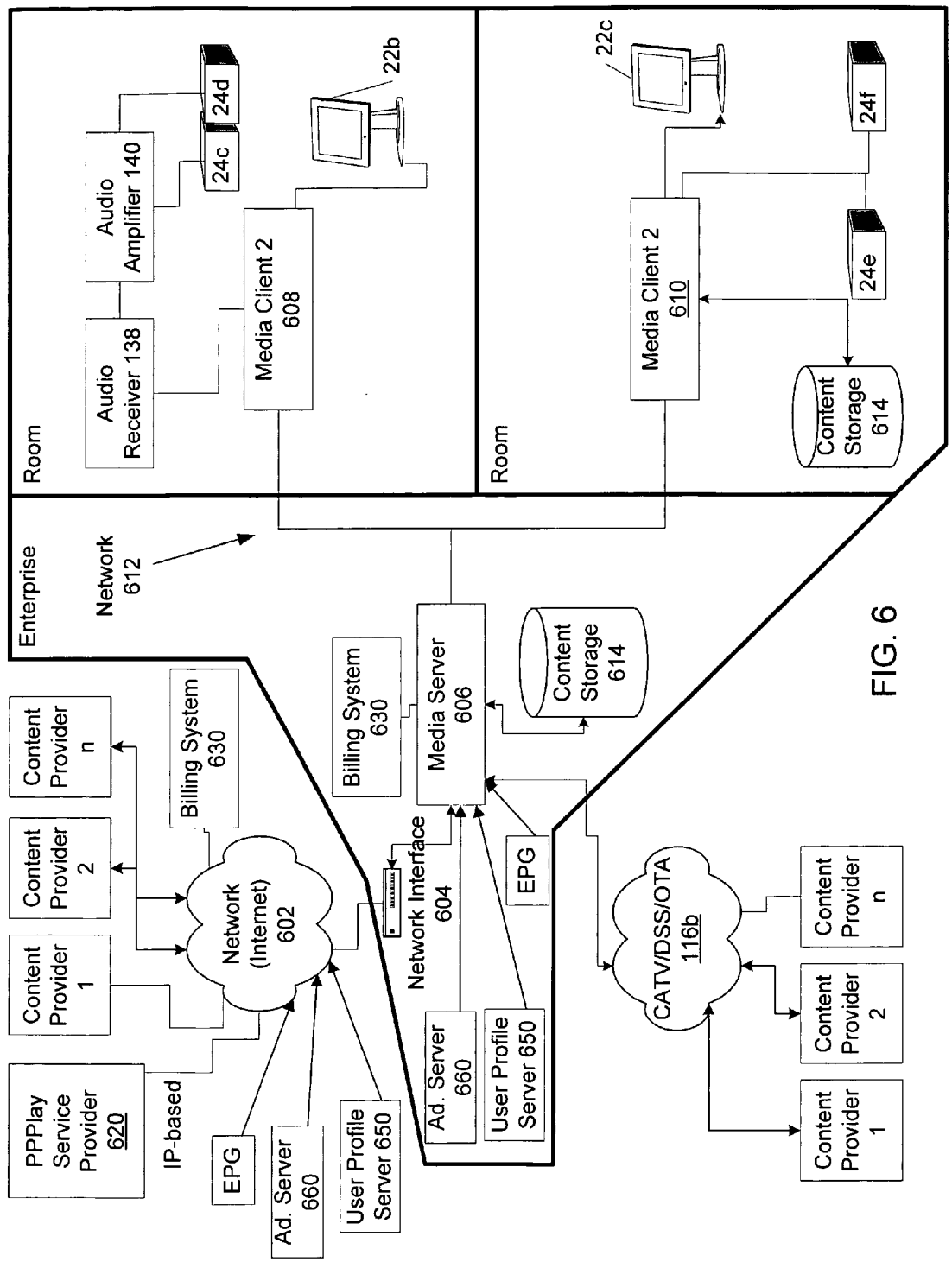
FIG. 6 is a block diagram illustrating a pay-per-view/pay-per-play system in accordance with yet another embodiment of the invention.

Referring now to FIG. 6, an alternative system 600 for rendering media content on a PPV basis in accordance with another embodiment of the invention is shown. The system 600 comprises content providers 1 through n in similar fashion as the system shown in FIGS. 1 and 2. These content providers are coupled with a content distribution network through the Internet 602. In this particular embodiment, the media content is provided in an IP format. The system 600 further comprises a network interface device 604. The network interface device 604 may comprise, for example, a data-over-cable-modem or a digital-subscriber line modem, along with a hub/router device. Of course, the use of other network interface devices is possible, such as a satellite connection to the Internet, for example.

The network interface device 604 is coupled with a media server 606 and a media client 608, 610 (media servers and media clients, collectively, are also referred to herein as "media devices") via a network 612, which may be similar in configuration to the components described with respect to FIG. 1 or 2. A media content storage device 614 can also be coupled with the media server 606 (or media client 608, 610) in a similar manner as has been previously described. For the system 600, information, including available content listings, from the content providers 1-n, 1a-na directly or through a content distribution service 620 is provided to the media server 606 via the Internet, the network interface device 604 and the network 612. The media server 606 likewise communicates with the media client via the network 612 and conveys said information from the content providers 1-n, 1a-na and/or the content distribution service 620, as well as information pertaining to the available media content on the remote and local media servers 606, all of which can comprise a media content guide (not shown) to be displayed on a display device 616, 618. For the system 600, the network interface device 604, the media server 606 and the media client 608, 610 communicate using a packet based (IP) protocol.

For the system 600, in a preferred embodiment the network interface device 604 receives information about the media content from the Internet, for example the media available from the content providers 1-*n*, 1*a*-*na* as well as content on media servers 606, media clients 608, 610 or media storage devices 614 at other enterprise locations (i.e., "remote" locations). The media content may be received by the system 600 via the Internet, or by another means, such as CATV or DSS, for example. The information about the media content received from the Internet using the system 600 comprises electronic program guide (EPG) information. The EPG information is communicated to at least the media server 606, and may also be communicated (via the network 612) to the media client 608, 610. The EPG information can be employed by the media server 606 and the media client 608, 610 to determine the composition of the media content that is stored by the content providers 1-*n*, 1*a*-*na*, on a media server 606, on content storage device 614, etc., in the local or associated enterprise (i.e., what media content is available, for example, on the media servers, content storage devices, etc., of the local hotel as well as what media content is available similar devices on other hotels in the chain, all of which are accessible via the Internet) so that content available for immediate rendering (i.e., content at the immediate enterprise location) on a PPV basis may be included in a media content guide (not shown) as well as media content available from, for example, content providers 1-*n*, 1*a*-*na* or from other enterprise locations for purchase, download and rendering on a PPV basis. The media content guide may be rendered on a display device 616 coupled with the media server or using the display device 618 coupled with the media client 608, 610.

In an alternative embodiment, the media server 606 and/or the media client 608, 610 is configured to include conventional Internet browsing capabilities. For example, the browsing capabilities may be comparable to those provided by Internet Explorer, as provided by Microsoft, Inc. of Redmond Wash. The guest can operate a media client 108, 110 to browse content available from online content providers 1-*n*, 1*a*-*na*. The enterprise preferably has existing agreements or contracts with content providers allowing access to the content providers' media content. Thus, there is no need for a guest to have a personal subscription to the content providers' services. The guest can select the desired program from a content provider's web site, which request can be monitored by the media server 606 and billed accordingly. Similarly, the media request can be registered by a PPPlay service provider 620 and billed to the guest according to any existing agreement between the content providers and the enterprise. In any case, identification information unique to the media client 608, 610 in the requesting guest's room and the media server 606 are included in the media request to the content provider 1-*n*, 1*a*-*na* or the PPPlay service provider 620 to ensure delivery of the preferably unrenderable to the proper media server 606 and media client 608, 610.

When an enterprise does not have an existing agreement with a content provider, content can still be delivered from a content provider to a guest who has a personal subscription with the content provider 1-*n*, 1*a*-*na*. In order to select and purchase content from a content provider web site, the user must provide the content provider with their account information and information unique to the media client 608, 610 they are using. Information specific to the media client can be provided to the guest for personal entry into the web site login page, but preferably, guest requests for content from a content provider is routed through the media server 606 and/or billing system 630 for appending of a unique identifier of the media client 608, 610 and media server 606 to the login information of the guest's personal subscription. With the contact information relayed, the content provider 1-*n*, 1*a*-*na* can communicate information pertaining to content that it wishes to be downloaded to the media server 606 and/or media client 608, 610.

In other related embodiments, the guest's personal media content device operatively connected to the internet (for example, a ReplayTV at her home or office) can act as a content provider while the guest is staying at an enterprise. Any free or PPPlay content stored on a guest's personal media content device can be retrieved by the media server 606 and/or media client 608, 610 and utilized by the guest. Encryption/decryption of the media content as described elsewhere is contemplated for these embodiments of the invention, as well as any associated DRM with any particular media content. For example, any piece of media content that is freely distributed, available for viewing by anyone at anytime may be retrieved by the media server 606 and/or media client 608, 610 and freely utilized by any other guests at an enterprise. Such media content may still be encrypted before transfer from the personal media content device to the media server 606 and/or media client 608, 610 at (or located remotely from) the enterprise. Preferably, the guest is provided the option to allow the open viewing of DRM-free media to other guests at an enterprise.

Where media content has DRM attached, for example, a PPPlay movie previously paid for and stored on the guest's personal media content device, the media content is preferably maintained in an unrenderable state unless unlocked by the digital rights-holder. As one example, the guest who has used a media server 606 and/or media client 608, 610 to retrieve media content from a personal media content device may be prompted to enter a login and password to make the previously paid-for PPPlay media content renderable by the system of the present invention, preferably only in the location within the enterprise inhabited by the guest who originally purchased the rendering rights. Thus, a guest, utilizing the present invention, has access to his own media content despite being at a location remote from the personal media content device. Further, a guest's access to the media content stored on her personal media content device can be incorporated into the user profiles described in greater detail below. For example, before a business person checks-in to her hotel, the media server 606 and/or media client 608, 610 can have pre-prepared for her arrival by accessing the guest's personal media content device and downloading media content according to the preferences listed in the user profile. Thus, utilizing the present invention enables direct access not only to a potential glut of media content available from the plethora of 'professional' content providers, but access to one's own personal content as well.

After the user's selection of content, the content provider's servers (or media servers 606 from other enterprise locations) negotiate with the media server 606 and/or media client 608, 610 to schedule the downloading of the piece of content to the media server 606 and/or media client 608, 610 (generally involving the transmittal of a unique identifier to ensure delivery of media content to the proper media server or media client). The announcement of the available piece of content preferably identifies the content and indicates the amount of storage space that it will require. The media server 606 and/or media client 608, 610 responds to the announcement by allocating storage space for the download and where appropriate scheduling the download. The media server 606 and/or media client 608, 610 downloads the piece of content from a specified location and provides status feedback to the content provider or remote media server 606 through completion of the download. Billing is enterprise-definable and can depend of many different parameters, for example, guest billing can occur once the download is successfully completed or once the guest has utilized a particular portion of the media, etc. Billing for media content procurement (downloading/transfer) according to user profiles (as described below) can similarly be enterprise-definable and can depend on many different parameters such as those suggested and others that would be obvious to one of ordinary skill in the art.

Once the guest's selected media content is successfully downloaded, the EPG is updated for the guest's media client with information about the selected piece of content. The EPG is preferably the same content guide that is used to display recorded broadcast programs and the like that are otherwise selectable and viewable through the media client 608, 610. A further preferred EPG includes concurrently displayed category and content areas. The category area displays a list of categories. Selection of a category updates the content area to list programs or other pieces of content pertaining to the category. Thus, selection of a "Sports" category updates the content area to display a list of sports programs available for viewing on the media client, media server, or content provider. Preferably a category corresponding to the content providers to which the enterprise has agreements or contracts is provided and included in the list of categories. Further, media clients on which media has been ordered and delivered through personal subscriptions preferably include a category corresponding to the relevant content providers. A preferred category label is the name of the content provider, but it can be a logo or other symbolic or alphanumeric representation as well. Automatic population of the guide provides an entry in the content guide that is displayed in the guide's content area when the "content provider" category is selected.

The media client (and media server) preferably also allows various operations on an entry once it resides in the content guide, such as suspending or resuming a download of the piece of content, playing the piece of content for viewing, or deleting the piece of content from the content guide.

The media server 606 and/or media client 608, 610 can also include instructions that allow the EPG to be updated through a network connection to a server. Thus, a server can maintain a list of approved content providers, and category labels for the approved content providers can be periodically downloaded to the media server 606 and/or media client 608, 610 that are in network communication with the server. Preferably, push or other conventional technologies are used to automatically update the EPG to include the new category label. This allows centralization of content provider approval, and is user friendly as the new category will simply appear in the EPG on the media server 606 and/or media client 608, 610 without requiring the user to go through a complex set of operations to update the guide. Preferably, the EPG available on the network, for example 116*a*, can be reconciled with content information within a particular enterprise. That is, the content available on the EPG can be supplemented by nonredundant content on any local or remote media server 606 or media client 608, 610, including, for example, specialty content generated in-house by the enterprise, content specifically purchased by a guest specific to a particular media client, etc. Thus, the EPG, when viewed on a display device 618, can be customized to reflect the media available to the media servers 606 or media clients 608, 610 to which it is attached.

It will be appreciated that numerous methods of implementing an operative connection between the network interface device 604, the media server 606 and the media client exist. For example, the operative connection may comprise a wireless connection in accordance with the IEEE 802.11 standard. Alternatively, the connection may comprise a Firewire connection in accordance with the IEEE 1394 standard. The media server 606 and media clients 608, 610 may also be connected by daisy-chaining and accessed using a pass-through device.

Of course, numerous other techniques for implementing such a connection exist and the invention is not limited to any particular approach.

Media server 606 is also connected to billing system 630. The billing system 630 tracks the access of content by users, so that the users are properly billed therefor. The billing system 630 can be accessed by an integrated or remote terminal that can be used by enterprise employees to access a guest's bill when a guest checks out. Any charges incurred by the guest for the right to render and view media can be presented to the guest on the bill during checkout. In addition, the billing system can interface with the media server 606, media clients 608, 610 and EPG to display current charges a guest has incurred on the video display 618 in the guest's room. Said charges can include all charges for media content purchase as well as other charges such as room, phone, room service and other charges.

Media content can be charged based on criteria determined by the enterprise alone or by agreement between the content provider 1-*n*, 1*a*-*na* and the enterprise. Billing rates can be, for example, a general default billing rate, a default billing rate for a media category, a custom (general) billing rate, and a custom billing rate for a media category, among others. Custom billing rates generally override default billing rates, and product billing rates are generally preferred over product category billing rates. Once a billing rate is selected, a discount can be applied. A discount can be applied, for example, according to a guest's user profile (as a reward for frequent use of the enterprise or the media content system of the invention, premiere customer status, etc.), as well as in compensation for perceived service missteps by the enterprise. One of ordinary skill in the art will recognize that discounts can be provided for numerous other reasons such as, for further example, to encourage patrons to purchase rendering rights to less popular media on the media server 606, media client 608, 601 or content provider 1-*n*, 1*a*-*na*. Discounts can also derive from agreements between the content providers and the enterprise, or wholly provided by the content providers (and communicated to the enterprise's media server 606 and billing system 630. Once the discount is applied, the adjusted amount for the purchased media rendering rights is added to the guest's bill.

7. Exemplary Guest or User Profile Embodiment

Figure 7:
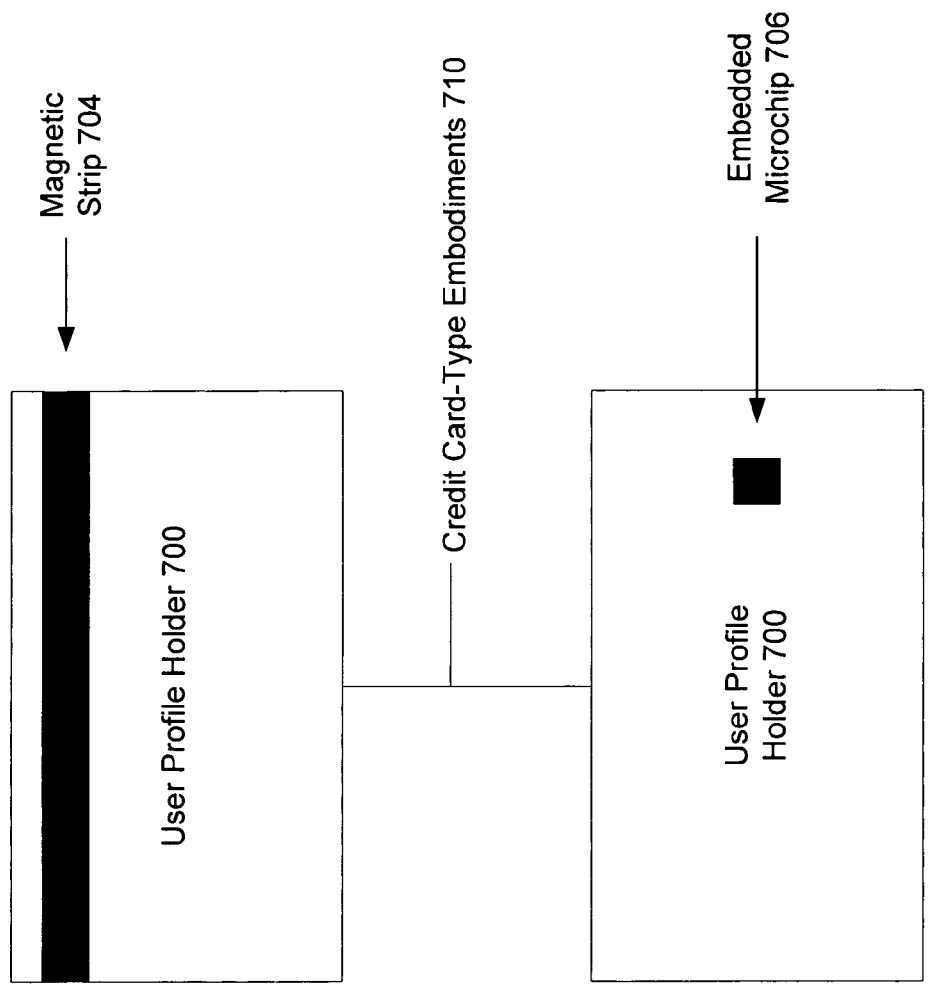
FIG. 7 is an exemplary embodiment of a User Profile and User Profile Holder.

Referring now to FIG. 7, an exemplary user profile is shown. Each guest and optionally members of the guest's party can be assigned a unique profile, or "user profile." The user profile can be stored on, for example, the media server 606, media client 608, 610 and the billing system 630. Preferably the user profile is stored on profile server 650 either on the enterprise premises or off site connected to Internet 602 and accessible to all related enterprise locations, for example, hotels in a hotel chain. The user profile information can also be maintained by the user or guest in many different forms, among them on a magnetic strip 704 and/or embedded microchip 706 in a user profile holder 700, for example a plastic credit card-type device 710 that can be carried by the guest and produced upon check-in at the enterprise. Optionally, the media client 608, 610 can have attached a reader that can read the user profile, for example a card reader for a credit card-type device 710 embodiment. One or more user-profile storage devices 704, 706 can be utilized in a user profile holder 700. Similarly, the user profile stored on the media server 606, media client 608, 610, billing system 630 or profile server 650 can be retrieved by enterprise personnel when reservations are made. In such embodiments, additional time is gained for downloading media content according to the user profile from content providers 1-*n*, 1*a*-*na* to the media server 606 or media client 608, 610 such that user profile-compatible media content is available for immediate purchase upon arrival of the guest. When the guest profile card is used upon check-in, the media server 606 or media client 608, 610 in the guest's room can request user profile-compatible media content to be downloaded from the content providers 1-*n*, 1*a*-*na* if less than an enterprise-definable amount of user profile-compatible is present on the media server 606, media client 608, 610, or media storage device 614 for immediate purchase. Of course, much of the media content already present on the media server 606 or media client 608, 610 may be compatible with the user profile, and the media server 606, media client 608, 610 and media storage device 614 will preferably refrain from downloading more than one copy of any particular piece of media content within the enterprise to optimize storage space.

The information gathered for and contained in the user profile can be used, for example, to customize media content services for the guest when said guest stays at the enterprise. User preferences can be stored as, for example, meta-data (or meta-tags). These meta-data can be gathered, for example, by tracking the media content purchases over time for each guest as well as by providing a user interface to input user preferences such as, for example, media content genre preferences, performer preferences, Motion Picture Association of America (MPM) rating preferences, and Recording Industry Association of America (RIM) rating preferences. Thus, for example, when a guest arrives at a reserved room, the media client 608, 610, media server 606, or content storage device 614 can have media content matching the user profile stored and ready for immediate purchase.

Meta-data or meta-tags associated with the digital content can include information about the digital content file. For a movie, such information can include the Motion Picture Association of America (MPAA) rating, title, year made, actors, directors and producers, film studio, genre, default billing rate, etc. For digital music, meta-data can include RIM explicit lyrics warnings, genre, artist, song title, album title, year recorded, default billing rate, etc. For a video game, meta-data can include a warning regarding the presence of sexual content, level of violence, genre, game title, year produced, etc. A person of ordinary skill in the art will recognize that the examples of meta-data described herein are exemplary, and that other types of meta-data can be included.

User profile can also include information pertaining to billing rate. Such billing information can be subordinate to or superior to the default billing rate for media content. Reward-based discounts, complimentary media content (from example, from the enterprise or content providers) or other custom billing information modifiers can also be included in the user profile.

Whether user profiles are stored on an on-site or off-site user profile server 650, user profile information is regularly updated and made available for later retrieval. As an example, if a user profile is updated to reflect a preferred customer discount on media content, this information can be relayed to the on-site or off-site back to off-site user profile server 650. The next time the user profile is accessed, even at a different enterprise in the enterprise chain, the preferred customer discount will be available to the user.

User profiles also pertain to television and cable programming. The local discovery service 440 (FIG. 4) and content directory 460 can be regularly updated by the media content manager 222 (FIG. 3) of the media server, which, in turn, can be regularly updated with information from, for example, a distribution server 101 (or PPPlay service provider, FIG. 2) or equivalent from the CATV/DSS/OTA network 116*b* (FIG. 2). As will be described in greater detail below, the these data sources provide meta-data information such as program titles, start times, end times, channel information and other criteria (such as ratings, descriptions of shows, names of actors, producers, directors, awards and rating information) regarding media programming. These data sources can be periodically polled to obtain changes, additions and additions of media content.

The local discovery service 440 (FIG. 4) and content directory 460 can be stored on the media client 608, 610 or a locally attached media content storage device 614. In an alternative embodiment, the channel guide database may be stored locally in alternative storage media such as RAM. In other embodiments, the local discovery service 440 and content directory 460 may be stored on a remote server, such as the media server 606, and periodically queried for matches with a user profile. The locally stored local discovery service 440 and content directory 460 would be replaced with a "match" database in such an embodiment. Such an embodiment reduces the need for local storage and reduces the required bandwidth and processing power to periodically obtain and store a complete local discovery service 440 and content directory 460 database. However, this embodiment does depend on a relatively reliable connection to the server storing the channel database.

The database stored on the local discovery service 440, content directory 460, and media content manager 222 provides criteria for selection of media content from the media server 606, media client 608, 610, or content provider 1-*n*, 1*a*-*na*. The criteria are user defined and input through a user interface on a display device 22. Based on matches between the meta-data on the databases stored on the local discovery service 440, content directory 460, and media content manager 222 describing the available media content and a user profile, appropriate media content can be downloaded to the media server 606 or media client 608, 610.

In the described embodiment, the media client 608, 610 is preferably a high capacity, recordable, randomly accessible recording medium such as a hard disk. Use of a randomly accessible recording medium provides certain advantages such as allowing a user to simultaneously record and playback video media content. Thus, a user may view a CATV/DSS/OTA program as it is being recorded and take advantage of the rewind, pause and fast forward capabilities of the media client 608, 610. Similarly, as described above, a user can also view video media content as it is being downloaded. In certain embodiments a sequential recording medium may be utilized without departure from certain aspects of the present invention.

The disclosed embodiment provides certain user interface features. For example, it is possible to fast forward and rewind through recorded or stored programming on the media client 608, 610. The user may preferably increase the rate of fast forwarding and/or rewinding of video content by continuing to depress the fast forward and/or rewind button (on the media client itself or on a remote control device) for a period of time. For example, if the button is pressed continuously, the system may fast forward or rewind at one speed and the speed may continuously increase the longer the button is depressed.

In addition, the media client preferably provides an instant replay function. The user may depress the instant replay button and the system will automatically "rewind" (i.e., move the point of viewing of the programming back in time) a predetermined or enterprise-definable or user-definable amount (e.g., 5 seconds) in the programming.

Figure 8:
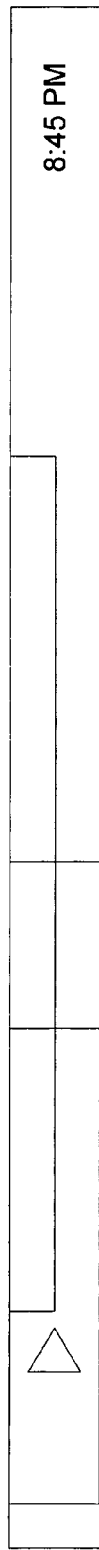
FIG. 8 is an exemplary schematic illustrating a media content guide as may be implemented in the present invention.

FIG. 8 illustrates a screen shot showing an exemplary user interface display of information from the local discovery service 440, content directory 460, or media content manager 222 (including content directory 306 and discovery service 304). As can be seen, in this embodiment the display shows CATV/DSS/OTA-type content, including show names and start and end times. Detailed information on any particular show can be displayed, for example, in a top portion of the screen. Of course, a user interface can also display other kinds of available media content such as, for example, movies and audio content that are available on the media server 606, media client, 608, 610, media storage device 614 or content provider 1-n, 1a-na. Alternative user interfaces will be apparent to one of ordinary skill in the art.

As has been discussed, the user profile stores user specified criteria for selection of media content for viewing, recording and purchase. The user may specify criteria for viewing or recording CATV/DSS/OTA-type content as well as for viewing or purchasing rendering rights for media content on the media server 606 or media client 608, 610 or media storage device 614, including media content title, a keywords such as actor, performer or director name, or text from a description of the media content, genre (such as action, mystery, and children for video, or rap, classical or rock for music, etc.) and rating information (both parental control and quality ratings).

The user can also specify the priority of the media content. With respect to CATV/DSS/OTA-type content, if two shows are scheduled to be recorded at the same time, the higher priority show will take precedent. In addition, the user may specify whether reruns are to be recorded and whether syndicated reruns are to be recorded (e.g., record reruns, but not syndicated reruns, record all reruns, etc.). For longer stays at one hotel or bridging stays across several in the chain (i.e., for a frequent traveler), the guest may specify the number of shows in a series to record (e.g., keep the most recent two shows). If a guest moves, for example, to another room at the same hotel or when the guest travels to another hotel in the chain, the media content specified by the guest's user profile and recorded can be sent, in the case of an inter-hotel transfer, from a media server 606 of one hotel, across the Internet 602 to a media server 606 at the other hotel, allowing inter-hotel time-shifting of CATV/DSS/OTA-type media content. Of course, in the interest of storage space, such flexible media content systems can be fully administered by the enterprise such that total storage space, storage time, number of user profile-compatible or specifically requested shows kept queued by the enterprise, etc., can be defined. Further, the enterprise may charge guests for different levels of media content time-shifting, such that greater amounts of media content stored or storage for longer time periods fetch higher service rates. Any media content can be transferred from one enterprise to another, preferably across the Internet 602 to, for example, lessen the load on the content providers 1-n, 1a-na a or provide access to media content that may be unavailable, temporarily or otherwise, from other content sources.

In certain embodiments, the user interface may provide for improved data input methods to ease the input of criteria information by the user. For example, when specifying a show name, the user may be presented with a pop-up alphabetical menu of all show titles in the local discovery service 440, content directory 460, and media content manager 222.

Another method of specifying criteria for recording a show or accessing other media content is to simply click on a media content name in the user interface. This is illustrated by FIG. 9, which again illustrates a screen shot showing an exemplary user interface, here showing CATV/DSS/OTA-type media content. In this illustration, the user has selected "COPS" by clicking on the "COPS" portion of the screen. The user may then click the record button a single time with a cursor control device. After the single click, a dot is placed on the screen by the "COPS" show name indicating the system is now programmed to recorded that episode of "COPS". Where the user interface displays available media content from the local discovery service 440, content directory 460, and media content manager 222 databases that is not CATV/DSS/OTA-type media content, similar organization schema can apply. Generally, however, start-times for such media content is not fixed and dependent only on whether the selected or user profile-compatible media content is immediately available on the media server 606 or media client 608, 610 or media storage device 614, or whether it must be procured and downloaded from a content provider 1-n, 1a-na.

Figure 9:
FIG. 9 is an exemplary schematic illustrating a media content guide as may be implemented in the present invention and illustrating single show recording.
Figure 10:
FIG. 10 is an exemplary schematic illustrating a media content guide as may be implemented in the present invention and illustrating series recording.

FIG. 10 illustrates an exemplary method of specifying that all shows in a series are to be recorded. In FIG. 9, the user clicked the record button a second time. In the described embodiment, this causes a double dot to be placed by "COPS" and all shows in the series "COPS" will be recorded. Clicking the record button a third time while COPS is selected will cause recording of the show to be cancelled.

In the described embodiment, the user may also depress the record button while viewing a show. A dialog box will appear asking whether the user wishes to record the show currently be watched or all shows in the series. The user may select either option. The show (and if requested all shows in the series) will then be recorded and a personal channel for the show will be created.

The user may also specify "negative" criteria—e.g., criteria indicating that a show is not to be recorded even if it otherwise meets criteria for recording. For example, a user may specify "Ignore all Seinfeld" and that particular situation comedy would not be recorded even if there is general criteria to record situation comedies. In addition, in such embodiments, the system may be configured such that shows meeting the negative criteria are not displayed when the channel guide data is displayed.

In addition to selecting CATV/DSS/OTA-type media content for recording based on exact matches to user entered criteria, CATV/DSS/OTA-type media content may also be selected based on "fuzzy match logic." A "fuzzy" match may occur where the description of a show matches some but not all keywords or satisfies less than all of the criteria. In addition, a "fuzzy" match may occur by the system making assumptions about the viewing habits of the user or by analyzing the media content selections of the user in light of any user profile generated through a questionnaire, be it in the form of enterprise-defined questions on the display device 618 or a paper-based survey whose answers are keyed into the invention and stored on the user profile server 650 and, optionally, a user profile holder 700. For example, if the user has been consistently recording a particular television series (e.g., "Law and Order" starring Vincent D'Onofrio), the fuzzy logic may choose to record a movie starring Vincent D'Onofrio. If the user typically chooses to record action movies by title, fuzzy logic may be employed to select an action movie for recording.

As another method of providing fuzzy logic selection of media content, after utilizing video or audio media content, the user may be asked to provide input on it. For example, the system may ask the user to rate their enjoyment of movie on a scale (e.g., 1-10), to rate the lead actor, to rate the lead actress, etc. The user profile can then be updated with information from the user's answers to the rating questions. This information can then be used in a "fuzzy" logic selection process, e.g., the user rates action movies that star Tom Cruise high. The fuzzy logic process may then look perform pattern matching for other action movies starring Tom Cruise or may employ further intelligence based, for example, on viewer surveys (such as other user profiles), to determine that a viewer who enjoys Tom Cruise action movies also enjoys Star Trek. Star Trek may then be selected for recording. It should be noted that while the system may employ fuzzy logic to directly select □ media content for recording in the case of CATV/DSS/OTA-type media content or downloading in the case of audio or video content available from content providers (i.e., not on the media server 606, media client 608, 610, or media storage device 614), in many implementations it may be preferable to query the user to determine if the media content should be recorded or downloaded.

The described embodiment also allows multiple users to provide criteria information. For example, in a room with an entire family staying therein, one or both parents and, optionally, the children or other guests may provide criteria information. The criteria information for each user can be stored separately in the criteria database or as a cumulative user profile. The system may then employ pattern matching and fuzzy logic to record shows which may be of interest to all users. Alternatively, the system can keep all user preferences in a multiple user scenario separate such that any user can access their own preferences, the combined preferences of the entire group, or the combined preferences of a subset of the group.

At any time, the user may preview CATV/DSS/OTA-type media content that will be recorded or media content to be downloaded from the media server 606 or content provider 1-n, 1a-na based on the criteria information provided. The user selects the preview function, and the system proceeds to match shows from the local discovery service 440, content directory 460, and media content manager 222 databases against the user profile. Based on the matching criteria, a list of shows to be recorded or prospectively downloaded is displayed. The user may then edit the list by, for example, deleting media content from the list that the user does not wish to be recorded or downloaded.

As one additional feature of the system, the system may provide notification to the user when media content of interest is available. For example, if a user downloaded several recently-released action movies over a short period of time, the system may notify the user when a new action movie is available based on information from the local discovery service 440, content directory 460, and media content manager 222 databases.

Recording Media Content

In certain embodiments of the present invention, a feature may be provided to allow continuous recording of a predetermined CATV/DSS/OTA channel or recording of specific CATV/DSS/OTA media content. Such functionality can preferably operate simultaneously on a media client 608, 610, in the background, while viewing or listening to media content on the media server 606, media client 608, 610 or media storage device 614. Alternatively, the media server can record CATV/DSS/OTA media content continuously or in response to the user profiles of the guests and make said recorded content available to the media clients 608, 610.

For example, the system may be configured to (or the user profile can set the system to) continuously record a CATV/DSS/OTA channel or record particular guest-chosen or user profile compatible programming so that the media content is recorded and available for viewing at the guest's preferred time. Such an embodiment is generally more applicable to CATV/DSS/OTA media content, or content that is broadcast at specific times, rather than, for example, movie media content available from content providers 1-n, which are generally available only with a specific download thereof.

With respect to continuous recording, CNN (or similar format video programming) is particularly of interest for such recording because the format is relatively fixed with news at a predetermined time during each hour, sports at another predetermined time, business news at another predetermined time, etc. If, for example, general news is provided on the hour, sports on the 15 minutes, business news at 25 minutes after the hour, weather at 40 minutes after the hour and special interest stories at ten minutes before the hour. If a user (or his user profile) configures 5 the system to continuously record CNN, and wants to watch business news, the user may sit down at minutes after the hour and watch the recorded business news from 40 minutes earlier rather than having to wait 20 minutes for the next real-time airing of business news.

User Profile-Driven Advertising

The present invention also provides for customized advertisements to be pushed to a media client 608, 610, preferably based on the guest's user profile. User profile meta-data is compared with a variety of advertisements stored in the media server 606 or on an advertising server 660 that can be stored on-site or off-site, operably connected to the media server or a media client, preferably connected to the Internet 602 and readily accessible to one or more parts of the enterprise, for example all hotels in a chain. Advertisement meta-data are compared to user profile meta-data, and the advertisements that are most compatible can be selected for presentation to the guest, preferably on the video display 618.

Because detailed meta-data about the guests are recorded in the process of media content selection, as well as home location, age and often other important parameters, advertisement campaigns can be directed at the applicable consumers based on their user profiles. For example, based on the car rented or plane flown by the user, the home address of, socio-economic status (based on room rented), etc. of the user, specific, customized deals can be selected for display to the user. A person of ordinary skill in the art will recognize additional means by which user profiles can be used to customize a marketing for each user.

As an exemplary overall picture, a guest with a user profile can, for example, reserves a room at a hotel that utilizes a media content delivery system of the present invention. Upon registration, the relevant user profile can be retrieved from the on-site or off-site user profile server 650. At an enterprise-definable period of time prior to guest check-in, the media server 606, media client 608, 610 in the guest's room and other rooms, as well as any media content storage units 614 associated with any of the media servers or media clients, can be searched, preferably by the media server 606, for content that matches or is appropriate according to the user profile. If none or, in some definable, an inappropriate amount of user profile-compatible media content is available locally at the enterprise (as defined by the enterprise or according to the optionally variable terms of the user profile, i.e., preferred guests versus standard guests, free user profiles services versus upgraded services available for a fee, etc.), the media server 606 can obtain suitable media content from content providers 1-*n*, 1*a*-*na* or from other enterprise locations (for example, other hotels in the hotel chain). Thus, upon check-in, the guest can have free and PPPlay media content readily available that is compatible with her user profile. Such content can include any time-shifted media content according the user profile. Alternatively, upon reading the guest's user profile from the user profile holder 700, for example upon check-in, the automatic user profile-driven media content procurement process described above can occur.

The user interface can present the readily available PPPlay media separately from other media or in addition to other readily available media content, for example any complimentary CATV/DSS/OTA content. The guest can search for PPPlay media content that is not available for immediate purchase, for example content located with the content providers 1-*n*, 1*a*-*na* or other enterprise locations, that need to be acquired from these remote locations, preferably over the Internet 602. Download progress can be displayed on the user interface, and such downloaded media content can preferably be played before the completion of its download. The user interface also provides a means to select media content (generally CATV/DSS/OTA-type content) for recording and later viewing, or time-shifting, including inter-enterprise time-shifting. Downloading and/or use of billable media content can be tracked by the media server 606 and/or the billing system 630

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A method for delivering media content, the method comprising:
    obtaining criteria for desired media content for each of a group of users and for a subset of the group of users at a media server, wherein the criteria are selectable by one or more users of the group of users using a user interface configured to enable each of the group of users to input the criteria for desired media content;
    updating a user profile with the criteria at the media server;
    receiving an indication related to a particular check-in event at the media server, wherein the check-in event is associated with the user profile;
    determining a particular period of time prior to the particular check-in event at the media server based on an enterprise-definable period of time prior to check-in events;
    during the particular period of time prior to the particular check-in event, the media server: selecting media content based on the criteria for the subset of users stored on the user profile and transmitting at least a portion of the selected media content to a media client associated with the check-in event; and
    rendering the media content using the media client.

2. The method of claim 1, wherein obtaining the criteria for the desired media content comprises receiving preference data via a user interface, wherein the user interface is in communication with the media server.

3. The method of claim 2, wherein the preference data comprises at least one of a media content name, a media content genre, a performer name, a year, and a billing rate.

4. The method of claim 2, wherein the preference data comprises at least one of a Motion Picture Association of America rating, a movie title, an actor name, a director name, a producer name, and a studio name.

5. The method of claim 2, wherein the preference data comprises at least one of a Recording Industry Association of America rating, a song title, an artist name, an album title, and an explicit lyric indication.

6. The method of claim 2, wherein the preference data comprises at least one of an indication of sexual content and an indication of violence.

7. The method of claim 1, wherein obtaining the criteria for the desired media content comprises retrieving media content purchase history data at the media server, wherein the media content purchase history data is associated with the user profile.

8. The method of claim 1, wherein the indication of the particular check-in event comprises a particular check-in time and a particular duration of a stay.

9. The method of claim 1, further comprising receiving a purchase request for the media content at the media client and transmitting the purchase request from the media client to the media server.

10. The method of claim 1, further comprising converting the media content from an unrenderable state to a renderable state at one of the media server and the media client.

11. The method of claim 10, wherein converting the media content from an unrenderable state to a renderable state comprises:
    receiving protected media content at the media server, wherein the protected media content comprises a transmission protocol encryption and a purchase protocol encryption, wherein the transmission protocol encryption prevents unauthorized reception of the protected media content and the purchase protocol encryption prevents unauthorized rendering of the protected media content;
    decrypting the protected media content using a transmission protocol decryption at the media server;
    receiving a purchase request at the media server, wherein the purchase request is associated with the protected media content;
    based on the purchase request, decrypting the protected media content using a purchase protocol decryption at one of the media server and the media client; and
    obtaining renderable media content from the protected media content at the media client.

12. The method of claim 1, further comprising presenting the media content at the media client.

13. A system for delivering media content, the system comprising:
    a media server, comprising:
        a media-server storage device;
        a media-server processor; and
        media-server software instructions, stored in the media-server storage device, that upon execution by the media-server processor, cause the media server to perform media-server functions comprising:
            obtaining criteria for desired media content for each of a group of users and for a subset of the group of users, wherein the criteria are selectable by one or more users of the group of users;
            updating a user profile with the criteria;
            receiving an indication related to a particular check-in event, wherein the check-in event is associated with the user profile;
            determining a particular period of time prior to the particular check-in event based on an enterprise-definable period of time prior to check-in events;
            during the particular period of time prior to the particular check-in event, selecting media content based on the criteria for the subset of users stored on the user profile and transmitting at least a portion of the selected media content; and
a media client associated with the particular check-in event, the media client comprising:
  a user interface;
  a media-client storage device;
  a media-client processor; and
  media-client software instructions, stored in the media-client storage device, that upon execution by the media-client processor, cause the media client to perform media-client functions comprising:
    obtaining the criteria for desired media content using the user interface, wherein the user interface is configured to enable each of the group of users to input the criteria for desired media content;
    communicating the criteria for desired media content;
    receiving the transmitted media content; and
    rendering the media content.

14. The system of claim 13, wherein obtaining the criteria for the desired media content comprises receiving preference data at the media server.

15. The system of claim 14, wherein the preference data comprises at least one of a media content name, a media content genre, a performer name, a year, and a billing rate.

16. The system of claim 14, wherein the preference data comprises at least one of a Motion Picture Association of America rating, a move title, an actor name, a director name, a producer name, and a studio name.

17. The system of claim 14, wherein the preference data comprises at least one of a Recording Industry Association of America rating, a song title, an artist name, an album title, and an explicit lyric indication.

18. The system of claim 13, wherein the indication of the particular check-in event comprises a particular check-in time and a particular duration of a stay.

19. The system of claim 13, wherein the media-client functions further comprise:
  receiving a purchase request for the media content; and
  transmitting the purchase request to the media server.

20. The system of claim 13, wherein the media-server functions further comprise:
  converting the media content from an unrenderable state to a renderable state.

21. The method of claim 1, wherein during the particular period of time prior to the particular check-in event, selecting media content based on the criteria for the subset of users stored on the user profile and transmitting at least a portion of the selected media content comprises:
  during the particular period of time prior to the check-in event, obtaining the selected media content from a plurality of devices.

22. The method of claim 21, wherein the plurality of devices comprises a personal media content device.

23. The method of claim 22, wherein the personal media content device is associated with the user profile.

24. The system of claim 13, wherein the media-server function of during the particular period of time prior to the check-in event, selecting media content based on the criteria for the subset of users stored on the user profile and transmitting at least a portion of the selected media content comprises:
  during the particular period of time prior to the particular check-in event, obtaining the selected media content from a plurality of devices.

25. The system of claim 24, wherein the plurality of devices comprises a personal media content device.

26. The method of claim 25, wherein the personal media content device is associated with the user profile.

* * * * *